(12) United States Patent
Fujita et al.

(10) Patent No.: US 7,869,330 B2
(45) Date of Patent: Jan. 11, 2011

(54) OPTICAL DISC APPARATUS AND METHOD FOR REPRODUCING INFORMATION

(75) Inventors: Goro Fujita, Kanagawa (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 12/046,039

(22) Filed: Mar. 11, 2008

(65) Prior Publication Data
US 2008/0239924 A1    Oct. 2, 2008

(30) Foreign Application Priority Data
Mar. 30, 2007    (JP)    ............................. 2007-094818

(51) Int. Cl.
*G11B 7/00*    (2006.01)
(52) U.S. Cl. ....................... 369/103; 369/53.23; 369/94
(58) Field of Classification Search ................... 369/94, 369/103, 112.01, 44.25, 44.26, 44.35, 44.36, 369/53.27, 53.28, 47.16, 47.41, 53.22, 53.23, 369/53.31; 359/22
See application file for complete search history.

(56) References Cited

U.S. PATENT DOCUMENTS 7,394,745 B2 *    7/2008    Miyatake ............... 369/112.01
7,505,389 B2 *    3/2009    Nishiwaki et al. ........... 369/103
7,576,900 B2 *    8/2009    Lan et al. ...................... 359/22

OTHER PUBLICATIONS

U.S. Appl. No. 12/038,201, filed Feb. 27, 2008, Fujita, et al.

* cited by examiner

*Primary Examiner*—Nabil Z Hindi
(74) *Attorney, Agent, or Firm*—Oblon, Spivak, McClelland, Maier & Neustadt, L.L.P.

(57) ABSTRACT

An optical disc apparatus reproducing information on the basis of a standing wave recorded on a disc-like volume type recording medium includes: a first focus position adjusting unit configured to adjust the position of a focus on which a first light beam focuses inside a recording layer inside the volume type recording medium in the optical axis direction of the first light beam; a second focus position adjusting unit configured to adjust the position of a focus on which a second light beam focuses inside the recording layer in the optical axis direction of the second light beam; a controller configured to control the first focus position adjusting unit and the second focus position adjusting unit; and first and second detectors configured to detect the first and second reproduction light beams.

10 Claims, 19 Drawing Sheets

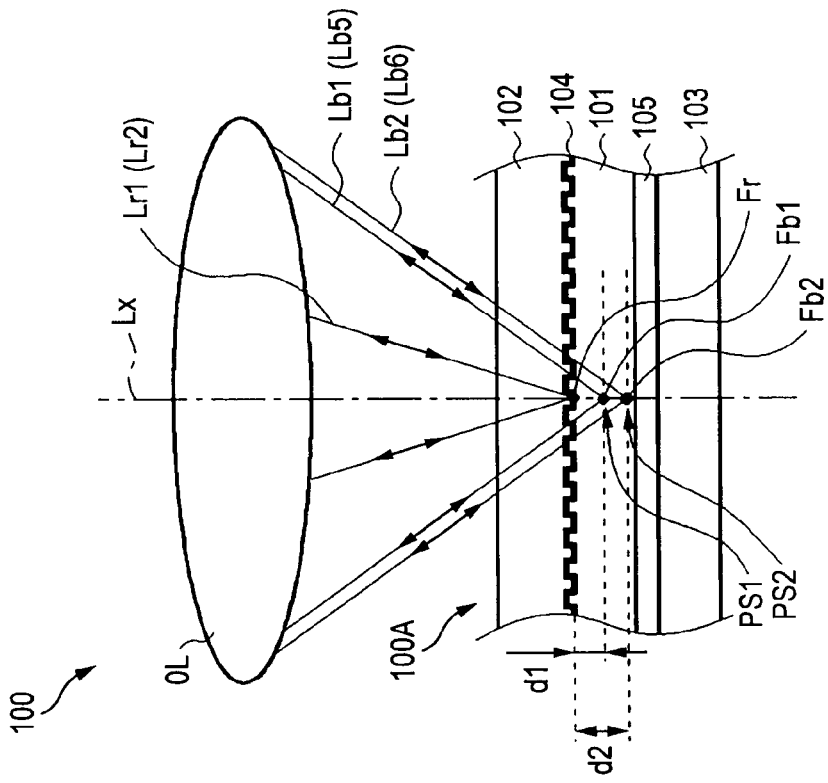
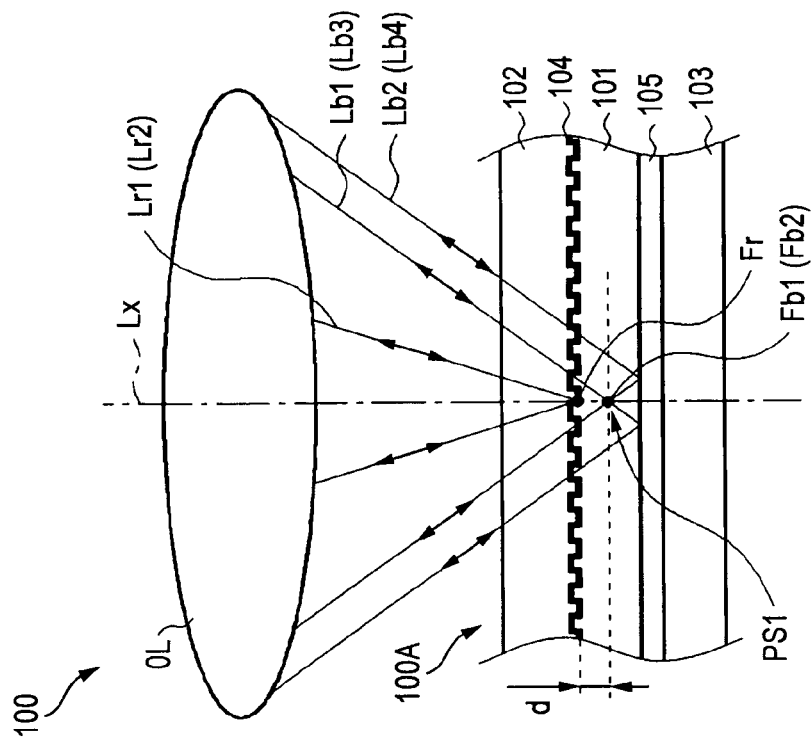

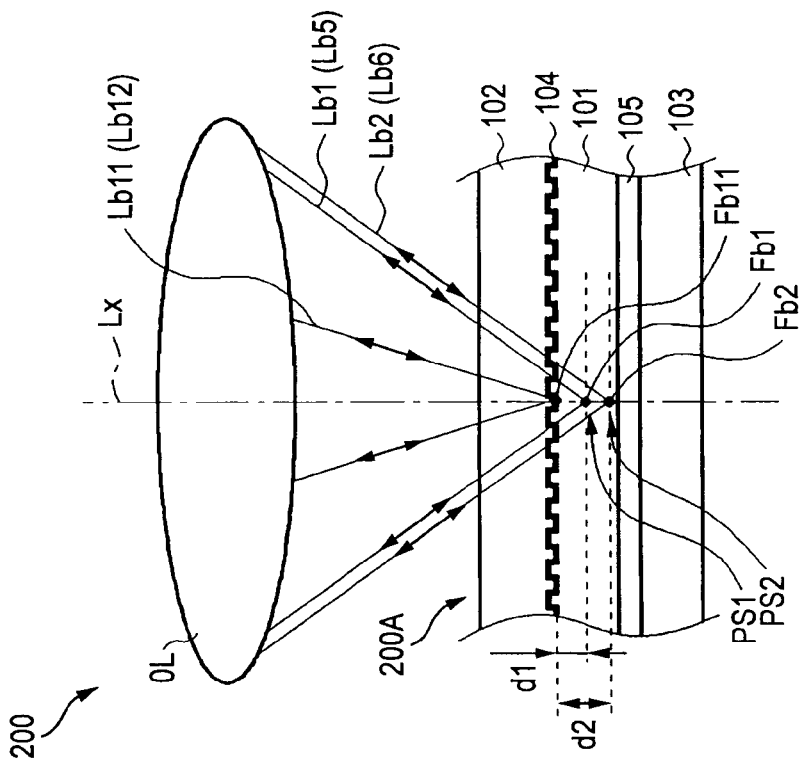
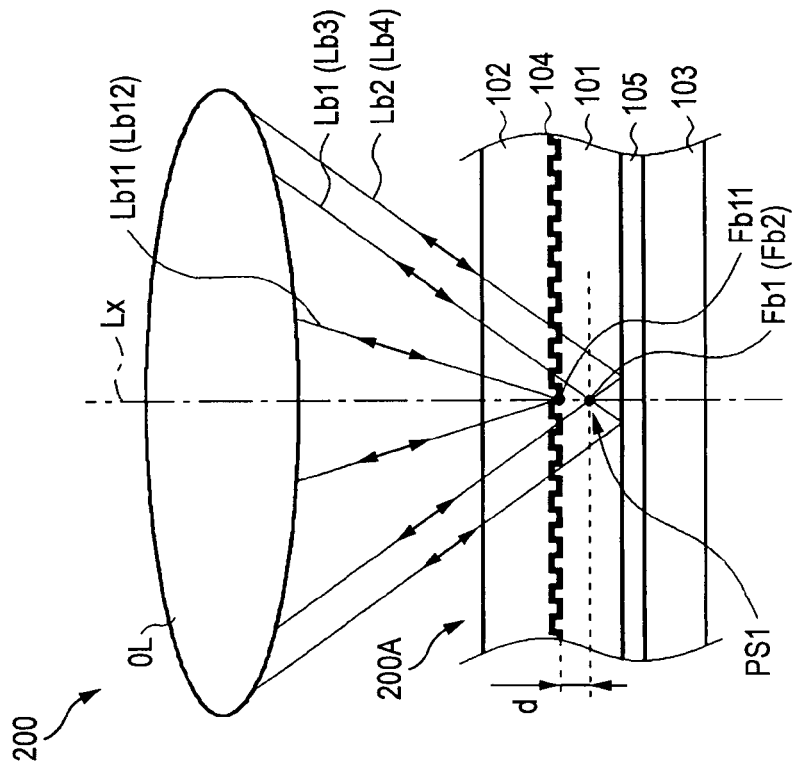

ated to a photodetector 12 via a pinhole plate 11.

OPTICAL DISC APPARATUS AND METHOD FOR REPRODUCING INFORMATION

CROSS REFERENCES TO RELATED APPLICATIONS

The present invention contains subject matter related to Japanese Patent Application JP 2007-094818 filed in the Japanese Patent Office on Mar. 30, 2007, the entire contents of which being incorporated herein by reference.

BACKGROUND OF THE INVENTION

1. Field of the Invention

The present invention relates to an optical disc apparatus and a method for reproducing information, being favorably applicable to an optical disc apparatus adapted to reproduce holograms recorded on optical discs, for example.

2. Description of the Related Art

An optical disc apparatus according to related art, in which a light beam is irradiated to an optical disc, such as a CD (compact disc), a DVD (digital versatile disc) and a Blue-ray Disc (registered trademark, hereafter referred to as BD), and the reflected light beam thereof is read so as to reproduce information, has been used widely.

In such an optical disc apparatus according to related art, information is recorded by irradiating a light beam to the optical disc and by changing the local reflectivity or the like of the optical disc.

With respect to the optical disc, it is known that the size of the optical spot formed on the optical disc is approximately given by $\lambda/NA$ ($\lambda$: wavelength, NA: numerical aperture) and that the resolution is proportional to this value. For example, the BD that is capable of recording approximately 25 [GB] of data on an optical disc of 120 [mm] in diameter is detailed in Y. Kasami, Y. Kuroda, K. Seo, O. Kawakubo, S. Takagawa, M. Ono, and M. Yamada, Jpn. J. Appl. Phys., 39,756 (2000) (Non-patent Document 1).

An optical disc is designed so as to record various contents, such as audio contents and video contents, or a variety of information, such as various data for computers. In particular, in recent years, the amount of information has increased to enable higher video resolution and higher audio quality. Furthermore, the number of contents to be recorded on a single optical disc is demanded to be increased. For these reasons, the optical disc is demanded to have larger capacity.

To fulfill such demands, a method has been proposed in which recording layers are overlaid inside a single optical disc to increase its recording capacity (for example, refer to I. Ichimura et al, Technical Digest of ISOM' 04, pp 52, Oct. 11-15, 2005, Jeju Korea (Non-patent Document 2)).

On the other hand, an optical disc apparatus that uses holograms as a recording method for recording information on optical discs has also been proposed (for example, refer to R. R. McLeod et al., "Microholographic multilayer optical disk data storage," Appl. Opt., Vol. 44, 2005, pp 3197 (Non-patent Document 3)).

For example, as shown in FIG. 1, in an optical disc apparatus 1, a light beam from an optical head 7 is once condensed and focused inside an optical disc 8 made of photopolymer or the like, the refraction index of which changes depending on the intensity of the light beam irradiated thereto. Then, the light beam is condensed at the same focus position once again in the opposite direction using a reflection device 9 provided on the back side (the lower side in FIG. 1) of the optical disc 8.

In the optical disc apparatus 1, a light beam, i.e., a laser light beam, is emitted from a laser 2, the wave of the light beam is modulated using an acoustooptical modulator 3, and the light beam is converted into a parallel light beam using a collimator lens 4. Furthermore, the light beam is transmitted through a polarization beam splitter 5 and converted from a linearly polarized light beam into a circularly polarized light beam using a quarter wavelength plate 6, and then enters the optical head 7.

The optical head 7 is designed so as to be able to record and reproduce information. The light beam is reflected by a mirror 7A, condensed by an objective lens 7B and irradiated to the optical disc 8 that is rotated using a spindle motor (not shown).

At this time, the light beam is once focused inside the optical disc 8 and then reflected by the reflection device 9 disposed on the back side of the optical disc 8. The reflected light beam is condensed at the same focus inside the optical disc 8 from the back side thereof. The reflection device 9 has a condensing lens 9A, a shutter 9B, a condensing lens 9C and a reflecting mirror 9D.

As a result, as shown in FIG. 2A, a standing wave is generated at the focus position of the light beam, and a recording mark RM is made. The recording mark is formed of a hologram having a small optical spot size and wholly having a shape in which two cones are connected such that the vortexes thereof are made contact with each other. The recording mark RM is thus recorded as information.

In the optical disc apparatus 1, when multiple recording marks RM are recorded inside the optical disc 8, the optical disc 8 is rotated, and the recording marks RM are disposed along concentric or spiral tracks, whereby one mark recording layer is formed. Furthermore, by adjusting the focus position of the light beam, it is possible to record the recording marks RM such that multiple mark recording layers are overlaid.

Hence, the optical disc 8 has a multi-layer structure having multiple mark recording layers therein. For example, as shown in FIG. 2B, the distance p1 (mark pitch) between the recording marks RM is 1.5 [μm], the distance p2 (track pitch) between the tracks is 2 [μm], and the distance p3 between the layers is 22.5 [μm].

Furthermore, in the optical disc apparatus 1, when information is reproduced from the optical disc 8 on which the recording marks RM are recorded, the shutter 9B of the reflection device 9 is closed so that the light beam is not irradiated from the back side of the optical disc 8.

At this time, in the optical disc apparatus 1, a light beam is irradiated to a recording mark RM inside the optical disc 8 using the optical head 7, and a reproduction light beam generated from the recording mark RM enters the optical head 7. This reproduction light beam is converted from a circularly polarized light beam into a linearly polarized light beam using the quarter wavelength plate 6 and then reflected by the polarization beam splitter 5. Furthermore, the reproduction light beam is condensed by a condensing lens 10 and irradi- At this time, in the optical disc apparatus 1, the photodetector 12 detects the amount of the reproduction light beam, and information is reproduced on the basis of the result of the detection.

SUMMARY OF THE INVENTION

In recent years, it is demanded not only to increase the amount of information to be recorded on the optical disc 8, but also to shorten the time required for recording and reproducing information by improving its recording speed and reproduction speed.

To satisfy these demands, the optical disc apparatus 1 may be necessary to increase the rotation speed of the optical disc 8 or to shorten the recording time of the recording marks RM.

However, in the optical disc apparatus 1, the increase in the rotation speed is limited in consideration of, for example, the strength of the optical disc 8 itself, the performance of the spindle motor or the fluctuation of the optical disc. In addition, a certain time may be necessary for physical and chemical reactions when the recording mark RM is formed. Hence, it is inevitable that the upper limits of the recording speed and the reproduction speed are determined because of these reasons.

Therefore, the optical disc apparatus 1 has a problem of making it difficult to shorten the time necessary for recording and reproduction.

Thus, it is desirable to provide an optical disc apparatus and an information reproducing method capable of completing reproduction of information from holograms recorded on an optical disc in a short time.

According to an embodiment of the present invention, there is provided an optical disc apparatus generating a reproduction light beam by irradiating a first or second light beam via a predetermined objective lens to a standing wave recorded on a disc-like volume type recording medium, which includes: a first focus position adjusting means for adjusting the position of a focus on which the first light beam focuses inside a predetermined recording layer in the optical axis direction of the first light beam; a second focus position adjusting means for adjusting the position of a focus on which the second light beam focuses inside the recording layer in the optical axis direction of the second light beam; a controlling means for controlling the first focus position adjusting means and the second focus position adjusting means so that, when the standing wave is recorded on the volume type recording medium, the first light beam focuses inside the recording layer and the second light beam transmitted through the recording layer and then reflected by a predetermined reflection face focuses on the same position as the first light beam focuses and, when reproduction light beams are generated from standing waves in the volume type recording medium, the position of the focus on which the first light beam focuses inside the recording layer and the position of the focus on which the second light beam focuses inside the recording layer are different from each other, thereby generating first and second reproduction light beams from standing waves different from each other; and first and second detecting means for detecting the first and second reproduction light beams.

With this configuration, the first and second reproduction light beams can be detected concurrently when information is reproduced. Hence, the speed of reading information from the optical disc can be increased by integrating the detection results of both the reproduction light beams.

Furthermore, according to another embodiment of the present invention, there is provided an information reproducing method generating a reproduction light beam by irradiating a first or second light beam via a predetermined objective lens to a standing wave recorded on a disc-like volume type recording medium, which includes the steps of: controlling a first focus position adjusting means for adjusting the position of a focus on which the first light beam focuses inside a predetermined recording layer in the optical axis direction of the first light beam and a second focus position adjusting means for adjusting the position of a focus on which the second light beam focuses inside the recording layer in the optical axis direction of the second light beam so that the position of the focus on which the first light beam focuses inside the recording layer is aligned with the position of the focus on which the second light beam focuses after the second light beam is transmitted through the recording layer and then reflected by a predetermined reflection face when the standing wave is recorded on the volume type recording medium; controlling the first focus position adjusting means and the second focus position adjusting means so that the position of the focus on which the first light beam focuses inside the recording layer is different from the position of the focus on which the second light beam focuses inside the recording layer when the reproduction light beams are generated, thereby generating first and second reproduction light beams from standing waves different from each other, respectively; and detecting the first and second reproduction light beams.

With this configuration, the first and second reproduction light beams can be detected concurrently when information is reproduced. Hence, the speed of reading information from the optical disc can be increased by integrating the detection results of both the reproduction light beams.

With the embodiments of the present invention, the first and second reproduction light beams can be detected concurrently when information is reproduced. Hence, the speed of reading information from the optical disc can be increased by integrating the detection results of both the reproduction light beams. Consequently, it is possible to provide an optical disc apparatus and an information reproduction method capable of completing information reproduction from holograms recorded on the optical disc in a short time.

BRIEF DESCRIPTION OF DRAWINGS

FIGS. 5A and 5B are schematic views showing the internal configuration of the optical disc according to the first embodiment;

FIGS. 16A and 16B are schematic views showing the internal configuration of an optical disc according to a second embodiment;

DESCRIPTION OF THE PREFERRED EMBODIMENTS

Figure 1:
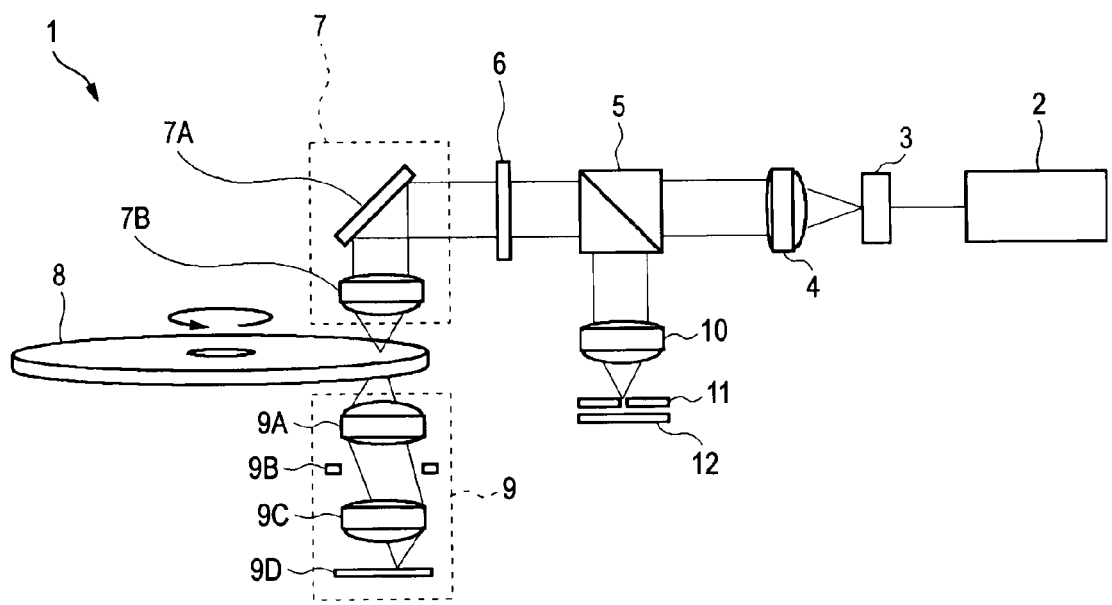
FIG. 1 is a schematic view showing the configuration of the standing wave recording optical disc apparatus according to related art.

Embodiments according to the present invention will be described below in detail referring to the drawings.

(1) Principle of Recording and Reproducing Information Using Holograms

First, the principle of recording and reproducing information using holograms will be described before the specific configuration of an optical disc according to an embodiment of the present invention is described.

Figure 3A:
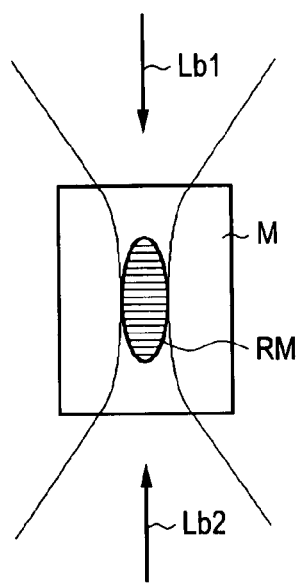
FIGS. 3A to 3C are schematic views showing the principle of hologram recording and reproduction.

In FIG. 3A, a recording medium M is formed into the shape of a nearly rectangular solid and is made of photopolymer or the like, which responds to a blue light beam having a wavelength of 405 [nm], for example, and the refraction index of which changes depending on the intensity of the light irradiated thereto.

When blue light beams Lb1 and Lb2 having a wavelength of 405 [nm] are irradiated at a predetermined intensity to this recording medium M from the upper and lower sides of the figure so as to be condensed, a standing wave is generated by the interference between the blue light beams Lb1 and Lb2, and a recording mark RM made of a hologram is formed.

Figure 3B:
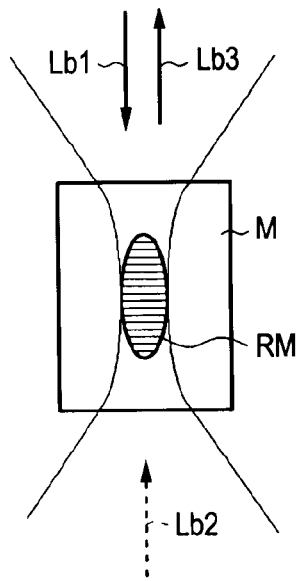

On the other hand, when the blue light beam Lb1, the wavelength of which is the same as that during recording is irradiated, this recording mark RM generates a blue reproduction light beam Lb3 due to the nature of the hologram as shown in FIG. 3B.

Figure 3C:
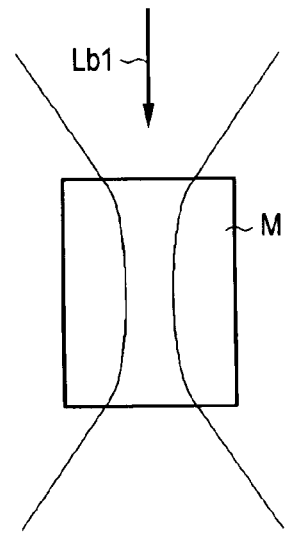

In addition, as shown in FIG. 3C, when the blue light beam Lb1 is irradiated to a place in which no recording mark RM is formed on the recording medium M, the blue reproduction light beam Lb3 is not generated.

Hence, for example, values "0" and "1" that are used when information is represented in binary format are assigned to "recording mark RM absent" and "recording mark RM present" respectively. It is thus possible to record or reproduce information on the recording medium M.

As described above, two kinds of light beams, such as the blue light beams Lb1 and Lb2, are used for information recording that uses hologram formation, and one kind of light beam, such as the blue light beam Lb1, is used for information reproduction.

(2) First Embodiment

(2-1) Configuration of Optical Disc

Next, an optical disc 100 that is used as an information recording medium according to this embodiment will be described below. As shown in an external view of FIG. 4, the optical disc 100 is formed as a whole into a disc shape having a diameter of approximately 120 [mm], just like CDs, DVDs and BDs having being used prevalently.

Furthermore, as shown in a sectional view of FIG. 5A, the optical disc 100 has a recording layer 101 configured to record information at its central portion, and both sides of the recording layer 101 are held between substrates 102 and 103.

The substrates 102 and 103 are made of materials, such as polycarbonate or glass. Light entering from one side of each of the substrates is transmitted to the opposite side thereof at a high transmission factor. Furthermore, the substrates 102 and 103 have a certain degree of strength so as to protect the recording layer 101.

The optical disc 100 is nearly symmetrical with respect to the center of the recording layer 101 in the thickness direction, and considerations are given as a whole to prevent warp, distortion and the like due to changes and the like with the elapse of time from occurring as much as possible. The surfaces of the substrates 102 and 103 may be covered with a nonreflecting coating to prevent unwanted reflection.

Just like the optical disc 8 (FIG. 1) and the recording medium M (FIGS. 3A to 3C), the recording layer 101 is made of photopolymer or the like, the refraction index of which changes depending on the intensity of light irradiated thereto, and is configured to respond to a blue light beam having a wavelength of 405 [nm].

In addition, the optical disc 100 has a reflection film 105 serving as a reflection layer between the boundary faces of the recording layer 101 and the substrate 103. The reflection layer 105 is configured so as to have a high reflection coefficient (for example, approximately 95% or more) when the blue light beams Lb1 and Lb2 having a wavelength of 405 [nm] are irradiated thereto.

In actuality, in the optical disc 100, it is assumed that the focus Fb2 obtained at the time when the blue light beam Lb2 is reflected by the reflection film 105 is aligned with the focus Fb1 of the blue light beam Lb1 at the time before the light beam Lb1 is irradiated to the reflection film 105 (the details will be described later).

Figure 2A:
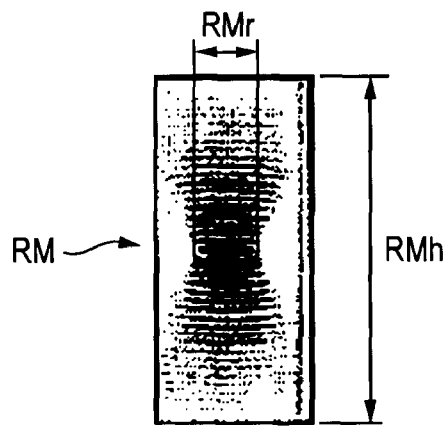
FIGS. 2A to 2C are schematic views showing how a hologram is formed.

At this time, inside the recording layer 101, as shown in FIG. 5A, the two blue light beams Lb1 and Lb2 having a relatively high intensity interfere with each other, and a standing wave is generated. As a result, an interference pattern having the nature of such a hologram as shown in FIG. 2A is formed.

Furthermore, the optical disc 100 has a reflection/transmission film 104 serving as a positioning layer between the boundary faces of the recording layer 101 and the substrate 102. The reflection/transmission film 104 is formed of a dielectric multilayer or the like and has wavelength selectivity in which the blue light beams Lb1 and Lb2 and the blue reproduction light beam Lb3 having a wavelength of 405 [nm] are transmitted and a red light beam Lr1 having a wavelength of 660 [nm] is reflected.

Moreover, guide grooves designed for tracking servo control are formed on the reflection/transmission film 104. More specifically, a spiral track having lands and grooves is formed, just as in the case of a commonly-used BD-R (recordable) disc. Addresses with serial numbers are assigned to the predetermined recording units of this track so that a track portion on which information is recorded or from which information is reproduced is specified according to the address.

On the reflection/transmission film 104 (on the boundary faces between the recording layer 101 and the substrate 102), pits or the like may be formed instead of the guide grooves, or the guide grooves may be combined with pits or the like. In essence, the addresses should only be recognized using light beams.

When the red light beam Lr1 is irradiated from the side of the substrate 102 to the reflection/transmission film 104, the reflection/transmission film reflects the light beam to the substrate 102. The light beam reflected at this time is hereafter referred to as the red reflection light beam Lr2.

In the optical disc apparatus, it is assumed for example that the red reflection light beam Lr2 is used for the position control (focus control and tracking control) of an objective lens OL to align a track to be targeted (hereafter referred to as the target track) with the focus Fr of the red light beam Lr1 that is condensed by the objective lens OL. The face of the optical disc 100 on the side of the substrate 102 is hereafter referred to as the side 100A.

In actuality, when information is recorded on the optical disc 100, the red light beam Lr1 is condensed by the objective lens OL, the position of which is controlled, and then focused on the target track on the reflection/transmission film 104 as shown in FIG. 5A.

Furthermore, the blue light beam Lb1, which is condensed by the objective lens OL and the optical axis Lx of which is the same as that of the red light beam Lr1, is transmitted through the substrate 102 and the reflection/transmission film 104 and is focused on the position corresponding to the back side (on the side of the substrate 103) of the target track inside the recording layer 101. At this time, the focus Fb1 of the blue light beam Lb1 is positioned away from the focus Fr on the common optical axis Lx with reference to the position of the objective lens OL.

Moreover, the blue light beam Lb2, the wavelength of which is the same as that of the blue light beam Lb1 and the optical axis of which is the same as that of the blue light beam Lb1, is condensed by the objective lens OL, transmitted through the substrate 102 and the reflection/transmission film 104, just like the blue light beam Lb1, and then reflected by the reflection film 105. At this time, the focus Fb2 of the blue light beam Lb2 is adjusted to the same position of the focus Fb1 of the blue light beam Lb1 using an optical device (not shown).

As a result, a recording mark RM formed of a relatively small interference pattern is recorded at the position of the focuses Fb1 and Fb2 corresponding to the back side of the target track inside the recording layer 101.

At this time, the blue light beam Lb1 and the blue light beam Lb2, both being convergent light beams, are overlaid inside the recording layer 101. A standing wave is generated at a portion having an intensity not lower than a predetermined intensity, and the recording mark RM is formed. Hence, as shown in FIG. 2A, the recording mark RM wholly has a shape in which two cones are connected such that the vortexes thereof are made contact with each other and such that the central section of the connection (the portion at which the vortexes of the two cones are made contact with each other) is slightly constricted.

The diameter RMr of the constricted portion at the central section of the recording mark RM is obtained from the following expression (1), assuming that the wavelength of the blue light beams Lb1 and Lb2 is $\lambda$ [m] and that the numerical aperture of the objective lenses OL1 and OL2 is NA:

$$RMr=1.2\times\lambda/NA \quad (1)$$

The height RMh of the recording mark RM is obtained from the following expression (2), assuming that the refraction index of the objective lenses OL1 and OL2 is n:

$$RMh=4\times n\times\lambda/NA^2 \quad (2)$$

For example, when it is assumed that the wavelength $\lambda$ is 405 [nm], the numerical aperture NA is 0.5 and the refraction index n is 1.5, the diameter RMr=0.97 [μm] is obtained using expression (1), and the height RMh=9.72 [μm] is obtained using expression (2).

Figure 2B:
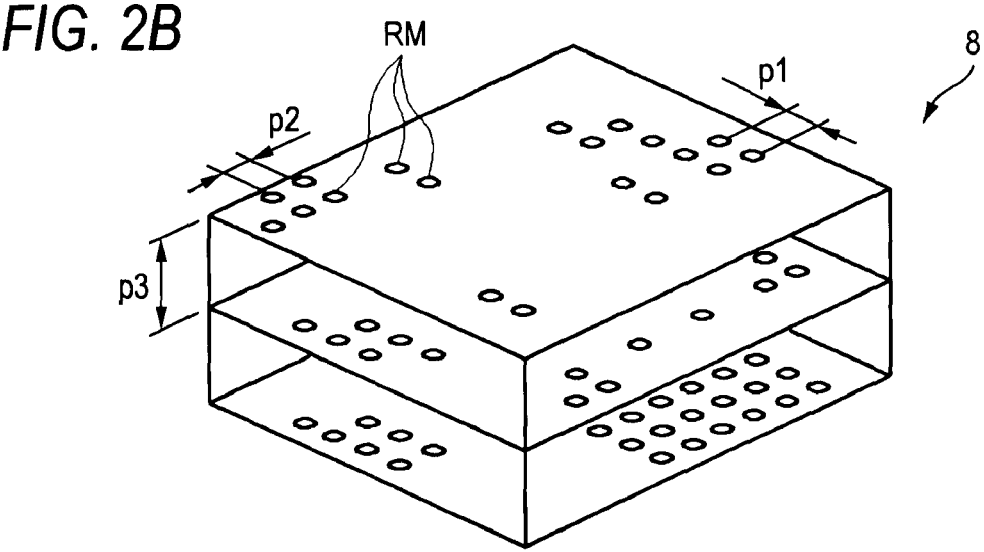
Figure 2C:
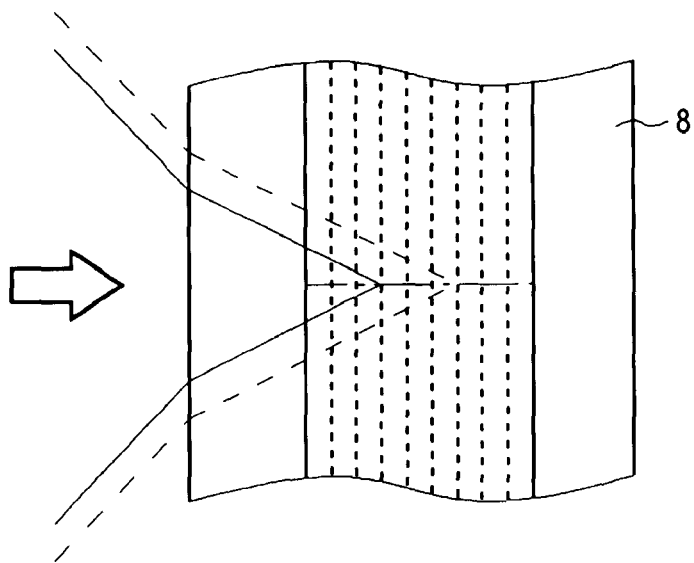

Furthermore, the optical disc 100 is designed such that the thickness t1 (0.31 [mm]) of the recording layer 101 is sufficiently larger than the height RMh of the recording mark RM. Hence, in the optical disc 100, the recording mark RM is recorded while the distance (hereafter referred to as the depth) from the reflection/transmission film 104 inside the recording layer 101 is switched. As a result, it is possible to carry out multilayer recording in which multiple mark recording layers are overlaid in the thickness direction of the optical disc 100 as shown in FIG. 2B.

In this case, the depth of the focus Fb1 of the blue light beam Lb1 and the depth of the focus Fb2 obtained after the blue light beam Lb2 is reflected by the reflection film 105 are adjusted inside the recording layer 101 of the optical disc 100, whereby the depth of the recording mark RM is changed. For example, when the distance p3 between the mark recording layers is set at approximately 15 [μm] in consideration of the mutual interference or the like between the recording marks RM, it is possible to form approximately 20 mark recording layers inside the recording layer 101. The distance p3 may be set at various values other than approximately 15 [μm] in consideration of the mutual interference or the like between the recording marks RM and other conditions.

On the other hand, as shown in FIG. 5B, when information is reproduced from the optical disc 100, the position of the objective lens OL is controlled so that the red light beam Lr1 condensed by the objective lens OL is focused on the target track on the reflection/transmission film 104, just as in the case that the information is recorded.

Furthermore, in the optical disc 100, the focus Fb1 of the blue light beam Lb1 transmitted through the substrate 102 and the reflection/transmission film 104 via the same objective lens OL is aligned with the position (hereafter referred to as the first target mark position PS1) corresponding to the "back side" of the target track inside the recording layer 101 and having the target depth.

At this time, the recording mark RM (hereafter referred to as the first recording mark RM1 for convenience of explanation) recorded at the position of the focus Fb1 generates the blue reproduction light beam Lb5 due to the nature of the hologram. This blue reproduction light beam Lb5 has optical characteristics similar to those of the blue light beam Lb1 irradiated (after reflection) when the recording mark RM1 is recorded, and proceeds while diverging in the same direction as that of the blue light beam Lb1, that is, from the inside of the recording layer 101 to the substrate 102.

Furthermore, when information on the optical disc 100 is reproduced, the focus Fb2 of the blue light beam Lb2 is adjusted using an optical device (not shown). Hence, as shown in FIG. 5B, the blue light beam Lb2 is not reflected by the reflection film 105 but is focused on a second recording mark RM2 located at the position (hereafter referred to as the second target mark position PS2) having a target depth (hereafter referred to as the second target depth) different from the target depth of the first recording mark RM1.

In this case, the second recording mark RM2 generates a blue reproduction light beam Lb6 due to the nature of the hologram. This blue reproduction light beam Lb6 proceeds while diverging in the same direction as that of the blue reproduction light beam Lb3, that is, from the inside of the recording layer 101 to the substrate 102.

When information is recorded on the optical disc 100 as described above, the red light beam Lr1 for position control and the blue light beams Lb1 and Lb2 for information recording are used. Hence, the recording mark RM is formed as the information at the position in which the focuses Fb1 and Fb2 are aligned with each other inside the recording layer 101, that is, the target mark position corresponding to the back side of the target track on the reflection/transmission film 104 and having the target depth.

Furthermore, when information recorded on the optical disc 100 is reproduced, the red light beam Lr1 for position control and the blue light beam Lb1 for information reproduction are used, and the blue reproduction light beam Lb5 is generated from the position of the focus Fb1, that is, the first recording mark RM1 recorded at the first target mark position PS1. In addition, the blue light beam Lb2 for information reproduction is used at the same time, and the blue reproduction light beam Lb6 is generated from the position of the focus Fb2, that is, the second recording mark RM2 recorded at the second target mark position PS2.

(2-2) Configuration of Optical Disc Apparatus

Figure 6:
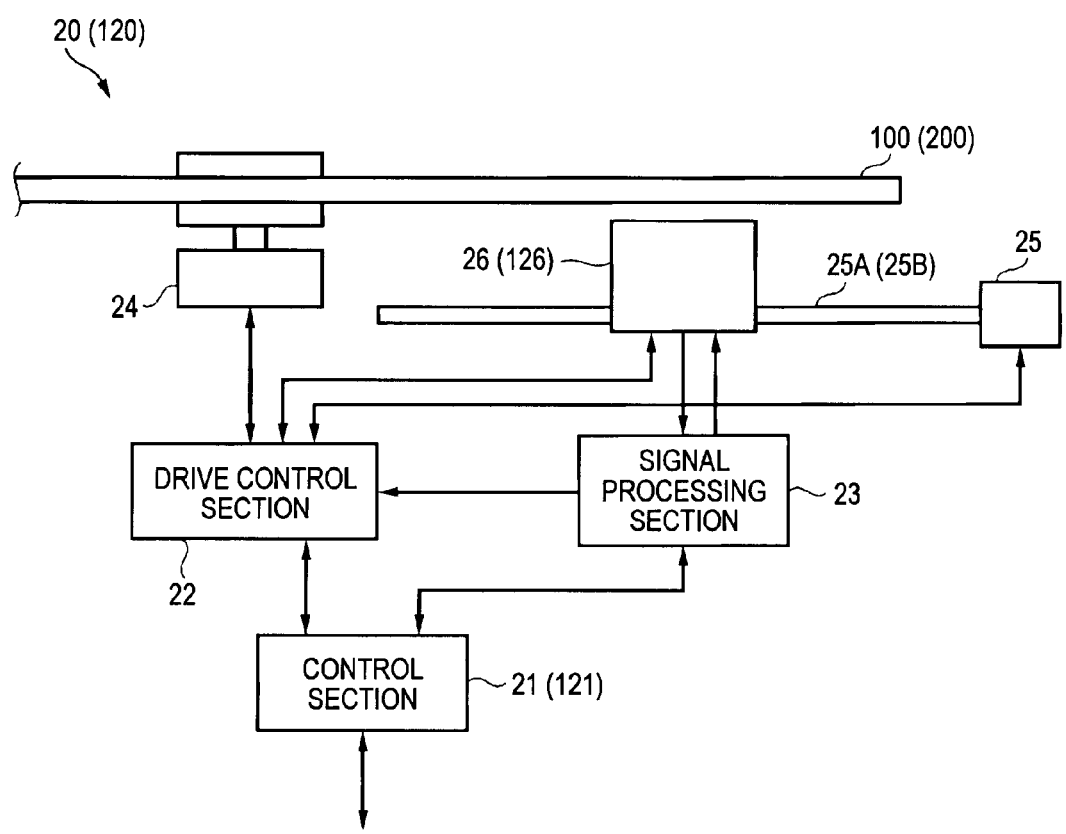
FIG. 6 is a schematic view showing the configuration of an optical disc apparatus according to the first embodiment of the present invention.

Next, an optical disc apparatus 20 adapted to the optical disc 100 described above will be described below. As shown in FIG. 6, the control section 21 of the optical disc apparatus 20 controls the entire system.

The control section 21 is mainly formed of a CPU (central processing unit, not shown). The control section 21 reads various programs, such as basic programs and information recording programs, from a ROM (read only memory, not shown) and loads these programs into a RAM (random access memory, not shown), thereby carrying out various processing, such as information recording processing.

For example, when the control section 21 receives an information recording instruction, recording information and recording address information from an external apparatus (not shown) while the optical disc 100 is mounted, the control section 21 supplies a drive instruction and the recording address information to a drive control section 22, and also supplies the recording information to a signal processing section 23. The recording address information is information indicating an address at which the recording information should be recorded, among the addresses assigned on the recording layer 101 or the reflection/transmission film 104 of the optical disc 100.

The drive control section 22 controls the driving of a spindle motor 24 according to the drive instruction, thereby rotating the optical disc 100 at a predetermined rotation speed, and also controls the driving of a thread motor 25, thereby moving an optical pickup 26 along movement axes 25A and 25B in the radial direction of the optical disc 100 (in the inner or outer circumferential direction) to the position corresponding to the recording address information.

The signal processing section 23 generates a recording signal by subjecting the supplied recording information to a variety of signal processing, such as predetermined encoding processing and modulation processing, and supplies the signal to the optical pickup 26.

The optical pickup 26 carries out focus control and tracking control under the control of the drive control section 22, thereby aligning the light beam irradiation position to the track (hereafter referred to as the target track) indicated using the recording address information on the recording layer 101 or the reflection/transmission film 104 of the optical disc 100 and then recording the recording mark RM depending on the recording signal from the signal processing section 23 (the details will be described later).

Furthermore, after receiving an information reproduction instruction and reproduction address information indicating the address of the recording information from an external apparatus (not shown), for example, the control section 21 supplies a drive instruction to the drive control section 22 and also supplies a reproduction processing instruction to the signal processing section 23.

Just as in the case of information recording, the drive control section 22 controls the driving of the spindle motor 24, thereby rotating the optical disc 100 at a predetermined rotation speed, and also controls the driving of the thread motor 25, thereby moving the optical pickup 26 to the position corresponding to the reproduction address information.

The optical pickup 26 carries out focus control and tracking control under the control of the drive control section 22, thereby aligning the light beam irradiation position to the track (the target track) indicated using the reproduction address information on the recording layer 101 or the reflection/transmission film 104 of the optical disc 100 and then irradiating a light beam having a predetermined amount of light. At this time, the optical pickup 26 detects the reproduction light beam generated from the recording mark RM on the recording layer 101 of the optical disc 100 and supplies a detection signal depending on the amount of the light to the signal processing section 23 (the details will be described later).

The signal processing section 23 generates reproduction information by subjecting the supplied detection signal to a variety of signal processing, such as predetermined demodulation processing and decoding processing, and supplies the reproduction information to the control section 21. In response to this, the control section 21 sends the reproduction information to an external apparatus (not shown).

As described above, the control section 21 of the optical disc apparatus 20 controls the optical pickup 26. Hence, information is recorded in the target track on the recording layer 101 of the optical disc 100, and information is reproduced from the target track.

(2-3) Configuration of Optical Pickup

Next, the configuration of the optical pickup 26 will be described below. As shown in a schematic view of FIG. 7, the optical pickup 26 is equipped with numerous optical components; the optical components are generally classified into a position-controlling optical system 30 and an information optical system 50.

(2-3-1) Configuration of Position-Controlling Optical System

Figure 7:
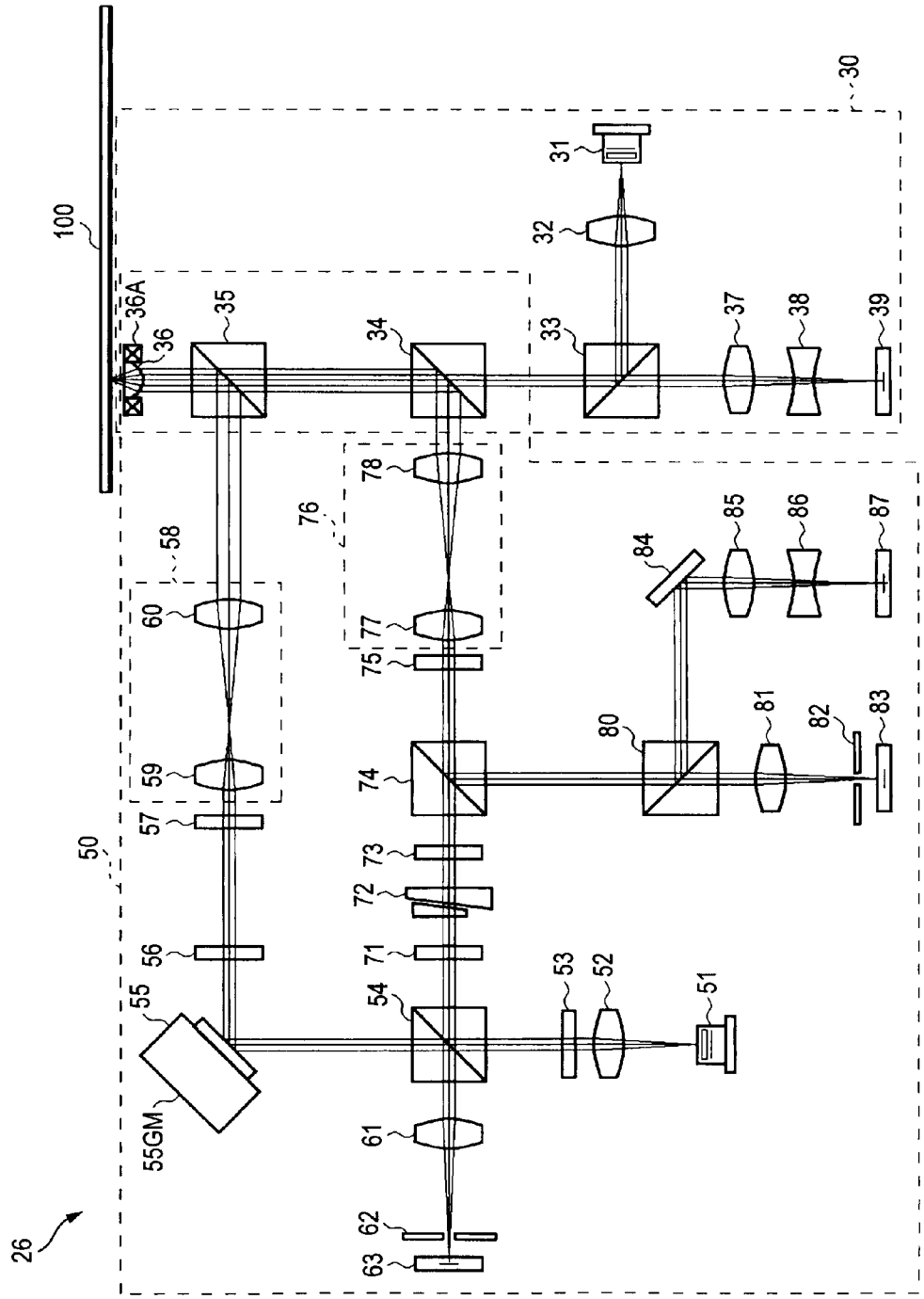
FIG. 7 is a schematic view showing the configuration of an optical pickup according to the first embodiment.
Figure 8:
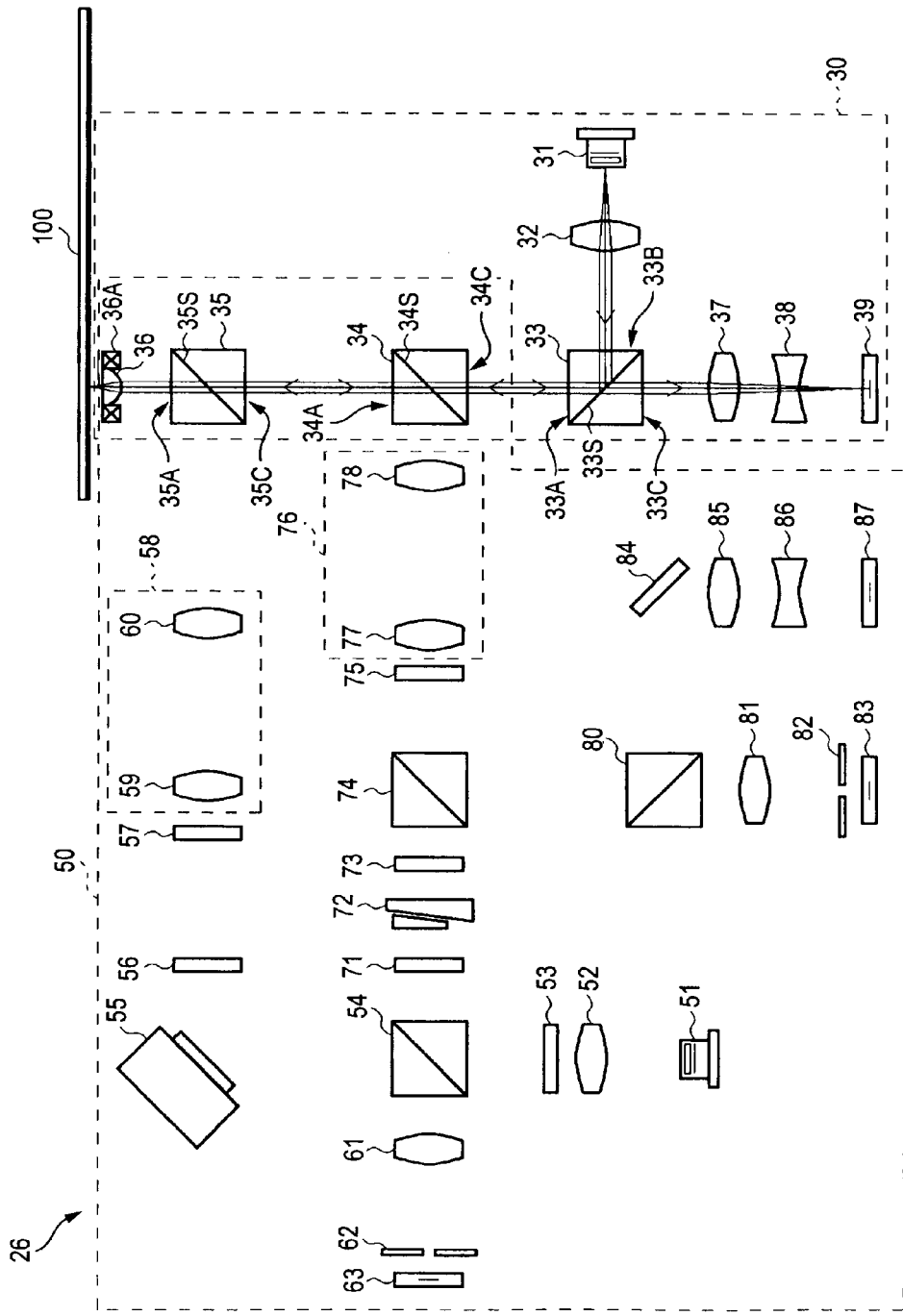
FIG. 8 is a schematic view showing the light path of a red light beam according to the first embodiment.

As shown in FIG. 8 corresponding to FIG. 7, the position-controlling optical system 30 is configured to irradiate the red light beam Lr1 to the face 100A of the optical disc 100 and to receive a red reflection light beam Lr2 that is generated when the red light beam Lr1 is reflected by the optical disc 100.

Figure 4:
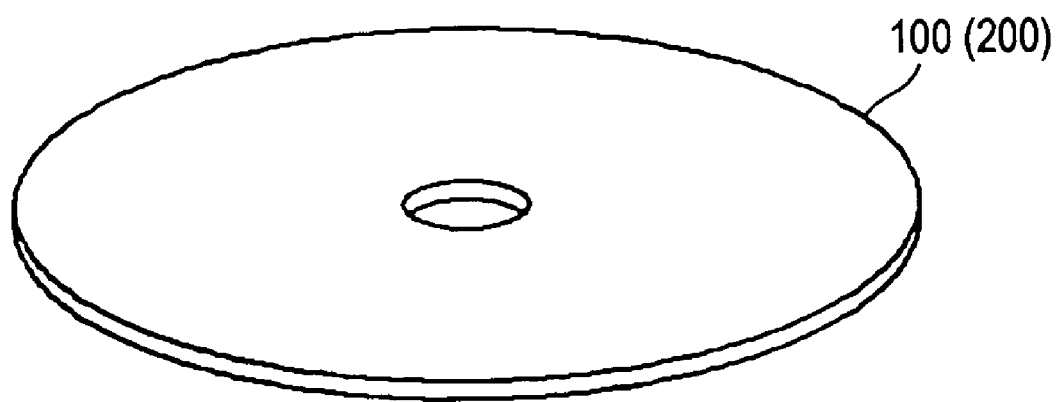
FIG. 4 is a schematic view showing the configuration of an optical disc according to a first embodiment of the present invention.

In FIG. 7, the laser diode 31 of the position-controlling optical system 30 is configured so as to be able to emit a red laser light beam having a wavelength of approximately 660 [nm]. In actuality, the laser diode 31 emits the red light beam Lr1, a divergent light beam having a predetermined amount of light, and causes the red light beam Lr1 to enter a collimator lens 32 under the control of the control section 21 (FIG. 4). The collimator lens 32 converts the red light beam Lr1 from a divergent light beam to a parallel light beam and causes the parallel light beam to enter the face 33B of an unpolarized beam splitter 33.

The unpolarized beam splitter 33 reflects the red light beam Lr1 at its reflection/transmission face 33S in a ratio of approximately 50% and causes the light beam to be emitted from the face 33A and to enter a dichroic prism 34.

The reflection/transmission face 34S of the dichroic prism 34 has the so-called wavelength selectivity in which the transmission factor and the reflection coefficient thereof are different depending on the wavelength of a light beam. In other words, a red light beam having a wavelength of 660 [nm] is transmitted in a ratio of almost 100% and a blue light beam having a wavelength of 405 [nm] is reflected in a ratio of almost 100%. Hence, the dichroic prism 34 causes the red light beam Lr1 to be transmitted through the reflection/transmission face 34S and to enter the face 35C of an unpolarized beam splitter 35.

The unpolarized beam splitter 35 causes part of the red light beam Lr1 to be transmitted through the reflection/transmission face 35S, to be emitted from the face 35A and to enter an objective lens 36.

The objective lens 36 condenses the red light beam Lr1 and irradiates the light beam to the face 100A of the optical disc 100. At this time, as shown in FIG. 5A, the red light beam Lr1 is transmitted through the substrate 102 and is reflected by the reflection/transmission film 104. The reflected light beam becomes the red reflection light beam Lr2 that proceeds in a direction opposite to that of the red light beam Lr1.

Then, the red reflection light beam Lr2 is converted into a parallel light beam by the objective lens 36, transmitted through the unpolarized beam splitter 35 and the dichroic prism 34 sequentially, and enters the face 33A of the unpolarized beam splitter 33.

The unpolarized beam splitter 33 causes the red reflection light beam Lr2 to be transmitted in a ratio of approximately 50%, to be emitted from the face 33C and to enter the condensing lens 37. The condensing lens 37 causes the red reflection light beam Lr2 to converge, and a cylindrical lens 38 causes the red reflection light beam Lr2 to have astigmatism and to be irradiated to a photodetector 39.

In the optical disc apparatus 20, the so-called surface fluctuation or the like may occur on the optical disc 100 when it rotates. Hence, it may be possible that the relative position of the target track with respect to the position-controlling optical system 30 changes.

For this reason, in order to cause the focus Fr (FIG. 5A) of the red light beam Lr1 to follow the target track in the position-controlling optical system 30, it maybe necessary to move the focus Fr in a focus direction in which the focus Fr is moved close to or away from the optical disc 100 and in a tracking direction in which the focus Fr is moved in the inner or outer circumferential direction of the optical disc 100.

The objective lens 36 is thus configured so as to able to be driven in two axis directions, the focus direction and the tracking direction, using a two-axis actuator 36A.

Furthermore, in the position-controlling optical system 30 (FIG. 8), the optical positions and the like of various optical components are adjusted so that the focused state at the time when the red light beam Lr1 is condensed by the objective lens 36 and irradiated to the reflection/transmission film 104 of the optical disc 100 is matched with the focused state at the time when the red reflection light beam Lr2 is condensed by the condensing lens 37 and irradiated to the photodetector 39.

Figure 9:
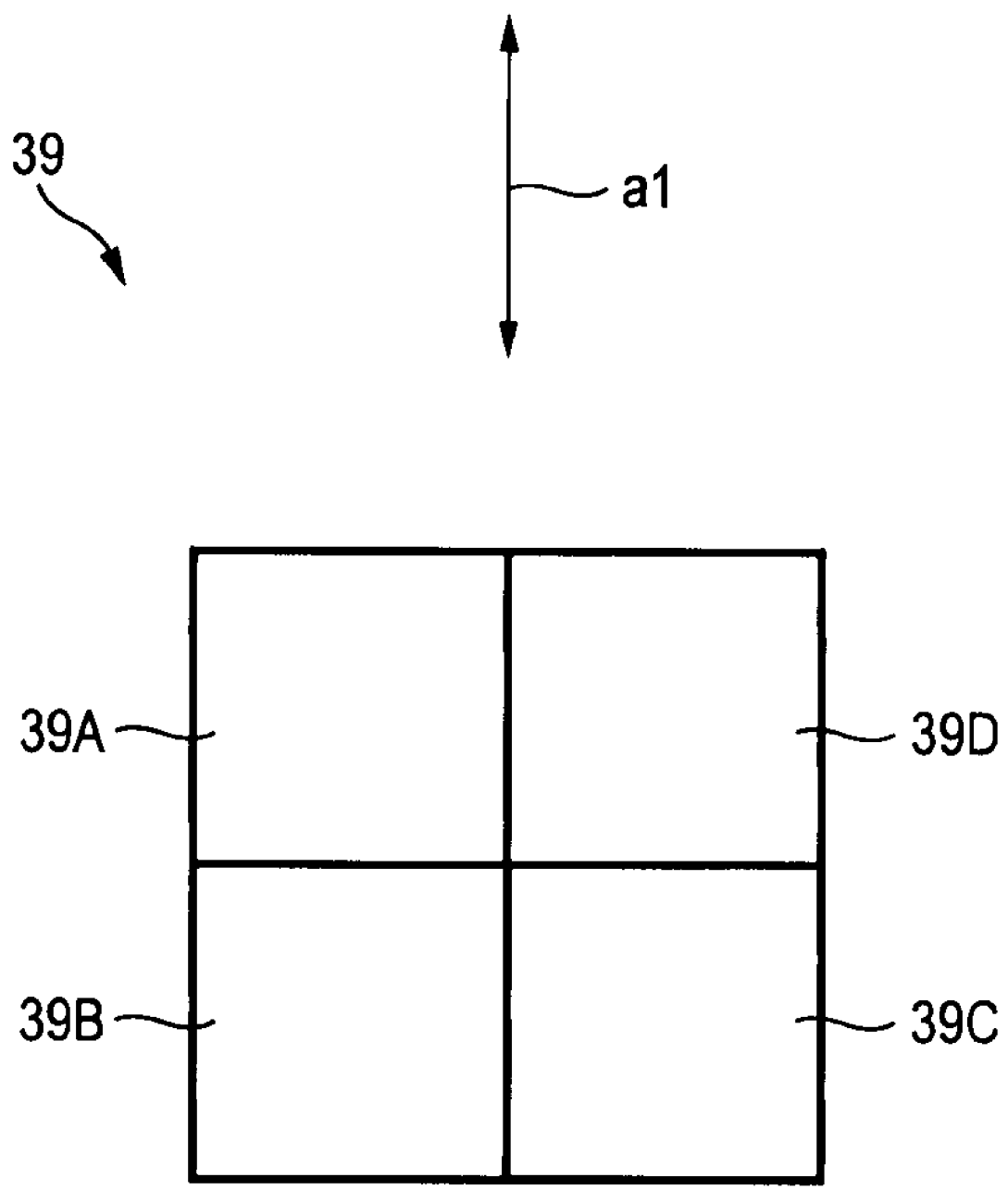
FIG. 9 is a schematic view showing the configuration (1) of the detection area of a photodetector.

As shown in FIG. 9, the photodetector 39 has four lattice-like divided detection portions 39A, 39B, 39C and 39D on its face to which the red reflection light beam Lr2 is irradiated. The direction (the vertical direction in the figure) indicated by arrow a1 corresponds to the track traveling direction when the red light beam Lr1 is irradiated to the reflection/transmission film 104 (FIG. 5A).

The photodetector 39 detects part of the red reflection light beam Lr2 in each of the detection portions 39A, 39B, 39C and 39D, generates detection signals SDAr, SDBr, SDCr and SDDr depending on the amount of light detected at this time, and sends these signals to the signal processing section 23 (FIG. 6).

The signal processing section 23 is configured so as to carry out focus control using the so-called astigmatism method. The signal processing section 23 calculates a focus error signal SFEr according to the following expression (3) and supplies this signal to the drive control section 22.

$$SFEr=(SDAr+SDCr)-(SDBr+SDDr) \quad (3)$$

This focus error signal SFEr denotes the amount of the deviation (distance) between the focus Fr of the red light beam Lr1 and the reflection/transmission film 104 of the optical disc 100.

Furthermore, the signal processing section 23 is also configured so as to carry out tracking control using the so-called push-pull method. The signal processing section 23 calculates a tracking error signal STEr according to the following expression (4) and supplies this signal to the drive control section 22.

$$STEr=(SDAr+SDDr)-(SDBr+SDCr) \quad (4)$$

This tracking error signal STEr denotes the amount of the deviation (distance) between the focus Fr of the red light beam Lr1 and the target track on the reflection/transmission film 104 of the optical disc 100.

The drive control section 22 generates a focus drive signal SFDr on the basis of the focus error signal SFEr and supplies the focus drive signal SFDr to the two-axis actuator 36A. As a result, the objective lens 36 is feedback-controlled (focus-controlled) so that the red light beam Lr1 is focused on the reflection/transmission film 104 of the optical disc 100.

Furthermore, the drive control section 22 generates a tracking drive signal STDr on the basis of the tracking error signal STEr and supplies the tracking drive signal STDr to the two-axis actuator 36A. As a result, the objective lens 36 is feedback-controlled (focus-controlled) so that the red light beam Lr1 is focused on the target track on the reflection/transmission film 104 of the optical disc 100.

As described above, the position-controlling optical system 30 is configured such that the red light beam Lr1 is irradiated to the reflection/transmission film 104 of the optical disc 100 and such that the result of receiving the red reflection light beam Lr2, i.e., the reflected light of the red light beam Lr1, is supplied to the signal processing section 23. In response to this, the drive control section 22 carries out focus control and tracking control for the objective lens 36 so that the red light beam Lr1 is focused on the target track of the reflection/transmission film 104.

(2-3-2) Configuration of Information Optical System

The information optical system 50 (FIG. 7) is configured so as to irradiate the blue light beams Lb1 and Lb2 to the face 100A of the optical disc 100 and to receive the blue light beams Lb3 and Lb4 entered from the optical disc 100.

(2-3-2-1) Light Path (1) of Blue Light Beam

Figure 10:
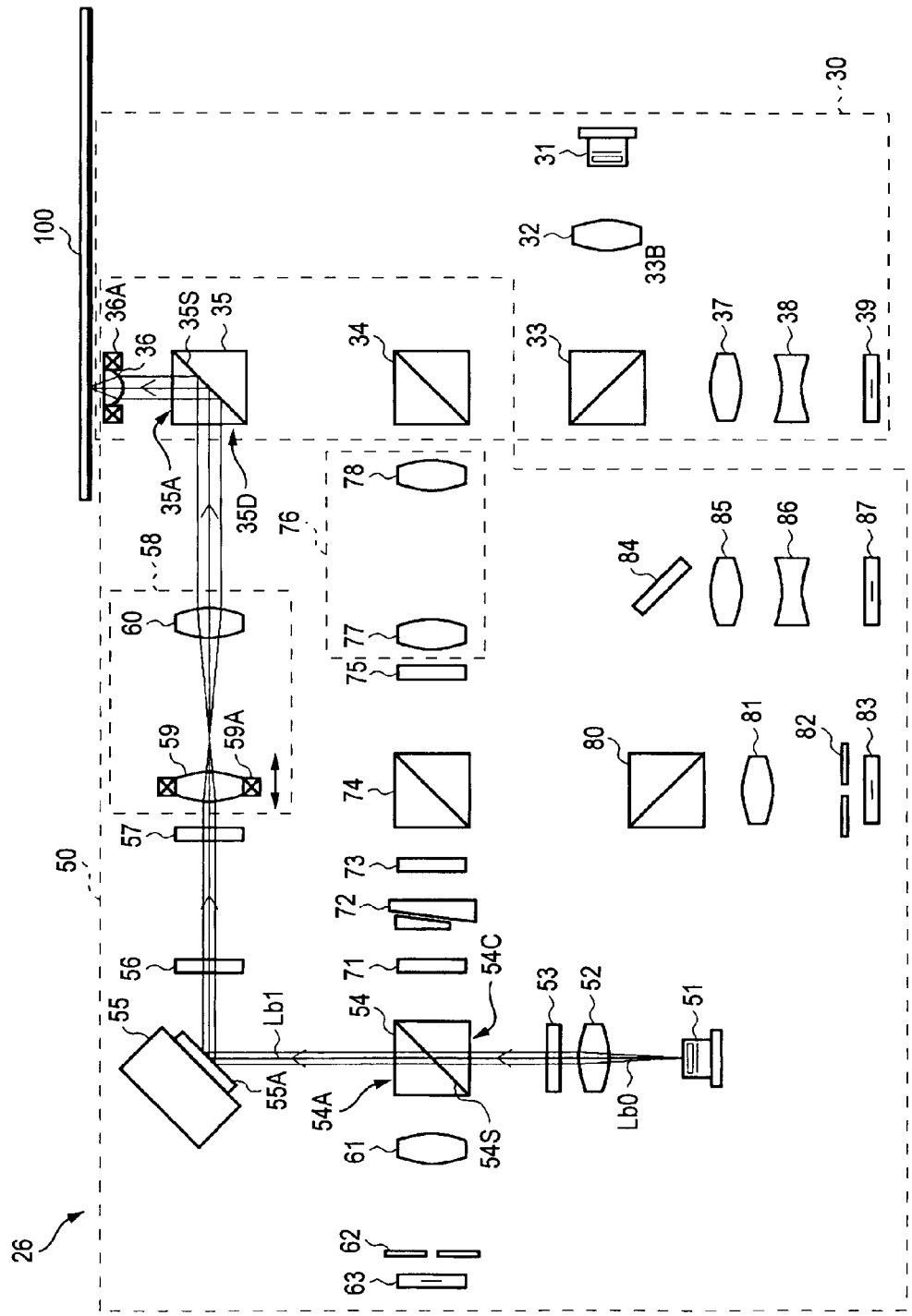
FIG. 10 is a schematic view showing the light path (1) of a blue light beam according to the first embodiment.

In FIG. 10 corresponding to FIG. 7, the laser diode 51 of the information optical system 50 is configured so as to be able to emit a blue laser light beam having a wavelength of approximately 405 [nm]. In actuality, the laser diode 51 emits a blue light beam Lb0, a divergent light beam, and causes the blue light beam Lb0 to enter a collimator lens 52 under the control of the control section 21 (FIG. 6). The collimator lens 52 converts the blue light beam Lb0 from a divergent light beam to a parallel light beam and causes the parallel light beam to enter a half-wavelength plate 53.

The polarization direction of the blue light beam Lb0 is rotated by a predetermined angle using the half-wavelength plate 53, and the p-polarization component thereof becomes approximately 50% and the s-polarization component thereof becomes approximately 50%, for example. The blue light beam Lb0 then enters the face 54C of a polarization beam splitter 54.

The polarization beam splitter 54 is configured so as to reflect or transmit the light beam at the reflection/transmission film 54S in a ratio being different depending on the polarization direction of the light beam. For example, the reflection/transmission film 54S is configured such that almost the entire p-polarized light beam is transmitted and such that almost the entire s-polarized light beam is reflected.

In actuality, the p-polarization component of the blue light beam Lb0 is transmitted by the reflection/transmission film 54S of the polarization beam splitter 54 and becomes the blue light beam Lb1. The blue light beam Lb1 is irradiated from the face 54A to a galvanometer mirror 55. The blue light beam Lb1 is reflected by the mirror face 55A of the galvanometer mirror 55 and enters a liquid-crystal panel 56.

The liquid-crystal panel 56 corrects comatic aberration and the like due to the spherical aberration of the blue light beam Lb1 and the inclination of the optical disc 100 and causes the light beam to enter a quarter wavelength plate 57. The quarter wavelength plate 57 converts the blue light beam Lb1 from a linearly polarized light beam into a right-handed circularly polarized light beam, for example, and causes the light beam to enter a relay lens 58.

The relay lens 58 converts the blue light beam Lb1 from a parallel light beam into a convergent light beam using a moving lens 59. Furthermore, the relay lens 58 reconverts the blue light beam Lb1 having become a divergent light beam after the convergence into a convergent light beam using a fixed lens 60 and causes the convergent light beam to enter the face 35D of the unpolarized beam splitter 35.

The moving lens 59 is configured so as to be moved in the optical axis direction of the blue light beam Lb1 using an actuator 59A. In actuality, the relay lens 58 is configured so as to be able to change the convergent state of the blue light beam Lb1 emitted from the fixed lens 60 by moving the moving lens 59 using the actuator 59A under the control of the control section 21 (FIG. 6).

The unpolarized beam splitter 35 causes the blue light beam Lb1 to be reflected by the reflection/transmission film 35S and to enter the objective lens 36. When the blue light beam Lb1 is reflected by the reflection/transmission film 35S, its circular polarization direction is inverted. For example, the polarization direction is converted from right-handed circularly polarization into left-handed circularly polarization.

The objective lens 36 condenses the blue light beam Lb1 and causes the light beam to be irradiated to the face 100A of the optical disc 100. In the case of the blue light beam Lb1, the objective lens 36 acts as a condensing lens having a numerical aperture (NA) of 0.5 due to the relationship to the relay lens 58, such as the optical distance thereto.

At this time, as shown in FIG. 5A, the blue light beam Lb1 passes through the substrate 102 and the reflection/transmission film 104 and is focused inside the recording layer 101. The position of the focus Fb1 of the blue light beam Lb1 is determined depending on the convergence state at the time when the blue light beam Lb1 is emitted from the fixed lens 60 of the relay lens 58. In other words, the focus Fb1 is moved to the side of the face 100A or the opposite side thereof inside the recording layer 101 depending on the position of the moving lens 59.

More specifically, the information optical system 50 is designed such that the movement distance of the moving lens 59 is nearly proportional to the movement distance of the focus Fb1 of the blue light beam Lb1. For example, when the moving lens 59 is moved 1 [mm], the focus Fb1 of the blue light beam Lb1 is moved 30 [μm].

In actuality, the control section 21 (FIG. 6) controls the position of the moving lens 59 of the information optical system 50 to adjust the depth d (the distance from the reflection/transmission film 104) of the focus Fb1 (FIG. 5A) of the blue light beam Lb1 inside the recording layer 101 of the optical disc 100.

As described above, in the information optical system 50, the position of the moving lens 59 of the relay lens 58 is controlled, whereby adjustment is made so that the focus Fb1 of the blue light beam Lb1 emitted from the face 54A of the polarization beam splitter 54 is positioned at a desired focal depth d inside the recording layer 101 of the optical disc 100. The light path that the blue light beam Lb1 follows is hereafter referred to as the blue light path 1.

(2-3-2-2) Light Path (2) of Blue Light Beam

Figure 11:
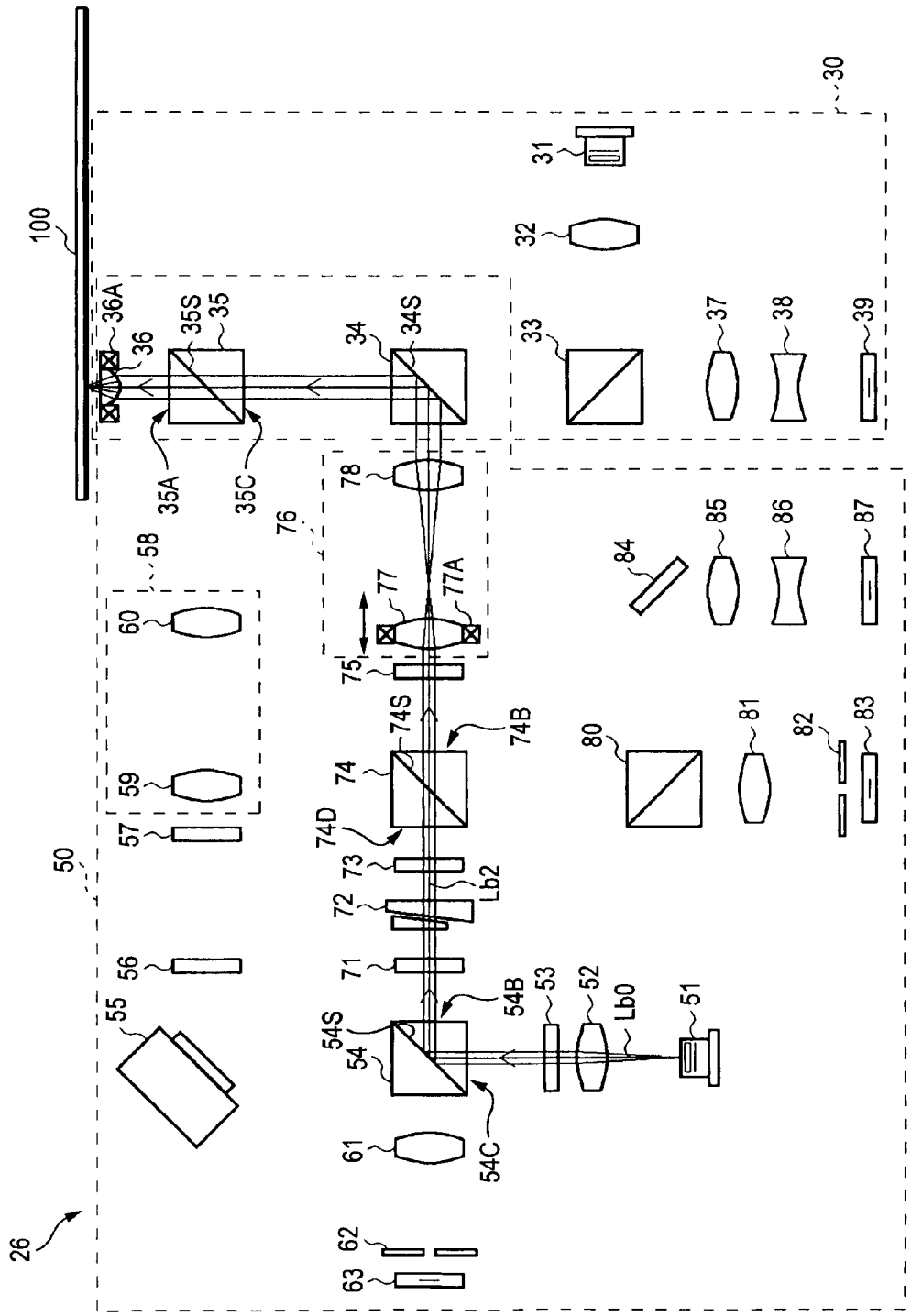
FIG. 11 is a schematic view showing the light path (2) of a blue light beam according to the first embodiment.

On the other hand, as shown in FIG. 11 corresponding to FIG. 7, when the blue light beam Lb0 enters the face 54C of the polarization beam splitter 54, the s-polarization component of the blue light beam Lb0 is reflected by the reflection/transmission film 54S, and the reflected light beam becomes the blue light beam Lb2 and enters from the face 54B to a liquid-crystal panel 71.

The liquid-crystal panel 71 corrects comatic aberration and the like due to the spherical aberration of the blue light beam Lb1 and the inclination of the optical disc 100 and causes the light beam to enter an optical compensator 72. The optical compensator 72 aligns the light path length of the blue light beam Lb2 with that of the blue light beam Lb1 using the difference in refraction index and causes the light beam to enter a half-wavelength plate 73.

The half-wavelength plate 73 converts the blue light beam Lb2 from an s-polarization light beam to a p-polarization light beam, for example, and causes the light beam to enter the face 74D of a polarization beam splitter 74.

Just like the polarization beam splitter 54, the polarization beam splitter 74 is configured so as to reflect or transmit the light beam at the reflection/transmission film 74S in a ratio being different depending on the polarization direction of the light beam. For example, the reflection/transmission film 74S is configured such that almost the entire p-polarized light beam is transmitted, and such that almost the entire s-polarized light beam is reflected.

In actuality, the p-polarized blue light beam Lb1 is transmitted by the reflection/transmission film 74S of the polarization beam splitter 74 and enters from the face 74B to a quarter wavelength plate 75. The quarter wavelength plate 75 converts the blue light beam Lb1 from a linearly polarized light beam into a right-handed circularly polarized light beam, for example, and causes the light beam to enter a relay lens 76.

The relay lens 76 is configured in a manner similar to that of the relay lens 58 and converts the blue light beam Lb2 from a parallel light beam into a convergent light beam using a moving lens 77. Furthermore, the relay lens 76 reconverts the blue light beam Lb2 having become a divergent light beam after the convergence into a convergent light beam using a fixed lens 78 and causes the convergent light beam to enter the face 34D of the dichroic prism 34.

The dichroic prism 34 causes the blue light beam Lb2 to be reflected by the reflection/transmission film 34S depending on the wavelength of the blue light beam Lb2, to emit from the face 34A and to enter the face 35C of the unpolarized beam splitter 35. When the blue light beam Lb2 is reflected by the reflection/transmission film 34S, its circular polarization direction is inverted. For example, the polarization direction is converted from right-handed circularly polarization into left-handed circularly polarization.

The unpolarized beam splitter 35 causes part of the blue light beam Lb2 to be transmitted through the reflection/transmission film 35S, to be emitted from the face 35A and to enter the objective lens 36.

The objective lens 36 condenses the blue light beam Lb2 and causes the light beam to be irradiated to the face 100A of the optical disc 100. In the case of the blue light beam Lb2, just as in the case of the blue light beam Lb1, the objective lens 36 acts as a condensing lens having a numerical aperture (NA) of 0.5 due to the relationship to the relay lens 76, such as the optical distance thereto.

At this time, as shown in FIG. 5A, the blue light beam Lb2 is transmitted through the substrate 102 and the reflection/transmission film 104, further transmitted once through the recording layer 101, reflected by the reflection film 105, and then focused inside the recording layer 101. The position of the focus Fb2 of the blue light beam Lb2 is determined depending on the convergence state at the time when the blue light beam Lb2 is emitted from the fixed lens 78 of the relay lens 76. In other words, the focus Fb2 is moved to the side of the face 100A or the opposite side thereof inside the recording layer 101 depending on the position of the moving lens 77.

More specifically, the information optical system 50 is designed such that the movement distance of the moving lens 77 is nearly proportional to the movement distance of the focus Fb2 of the blue light beam Lb2, just as in the case of the blue light beam Lb1. For example, when the moving lens 77 is moved 1 [mm], the focus Fb2 of the blue light beam Lb2 is moved 30 [μm].

In actuality, the control section 21 (FIG. 6) controls the position of the moving lens 77 of the information optical system 50 to adjust the depth d (the distance from the reflection/transmission film 104) of the focus Fb2 (FIG. 5A) of the blue light beam Lb2 inside the recording layer 101 of the optical disc 100.

The relay lenses 58 and 76 are designed such that the focus Fb1 of the blue light beam Lb1 is aligned with the focus Fb2 of the blue light beam Lb2 by adjusting the moving lenses 59 and 77 to positions complementary to each other under the control of the control section 21.

As described above, in the information optical system 50, the position of the moving lens 59 of the relay lens 58 is controlled, whereby adjustment is made so that the focus Fb2 of the blue light beam Lb2 emitted from the face 54B of the polarization beam splitter 54 is positioned at a desired focal depth d inside the recording layer 101 of the optical disc 100. The light path that the blue light beam Lb2 follows is hereafter referred to as the blue light path 2.

(2-3-2-3) Light Path (3) of Blue Light Beam

The blue light beam Lb2 shown in FIG. 11 is condensed at the focus Fb2 (FIG. 5A), proceeds without change and is diffused again, thereby becoming the blue light beam Lb3. The blue light beam Lb3 will be described below next.

Figure 12:
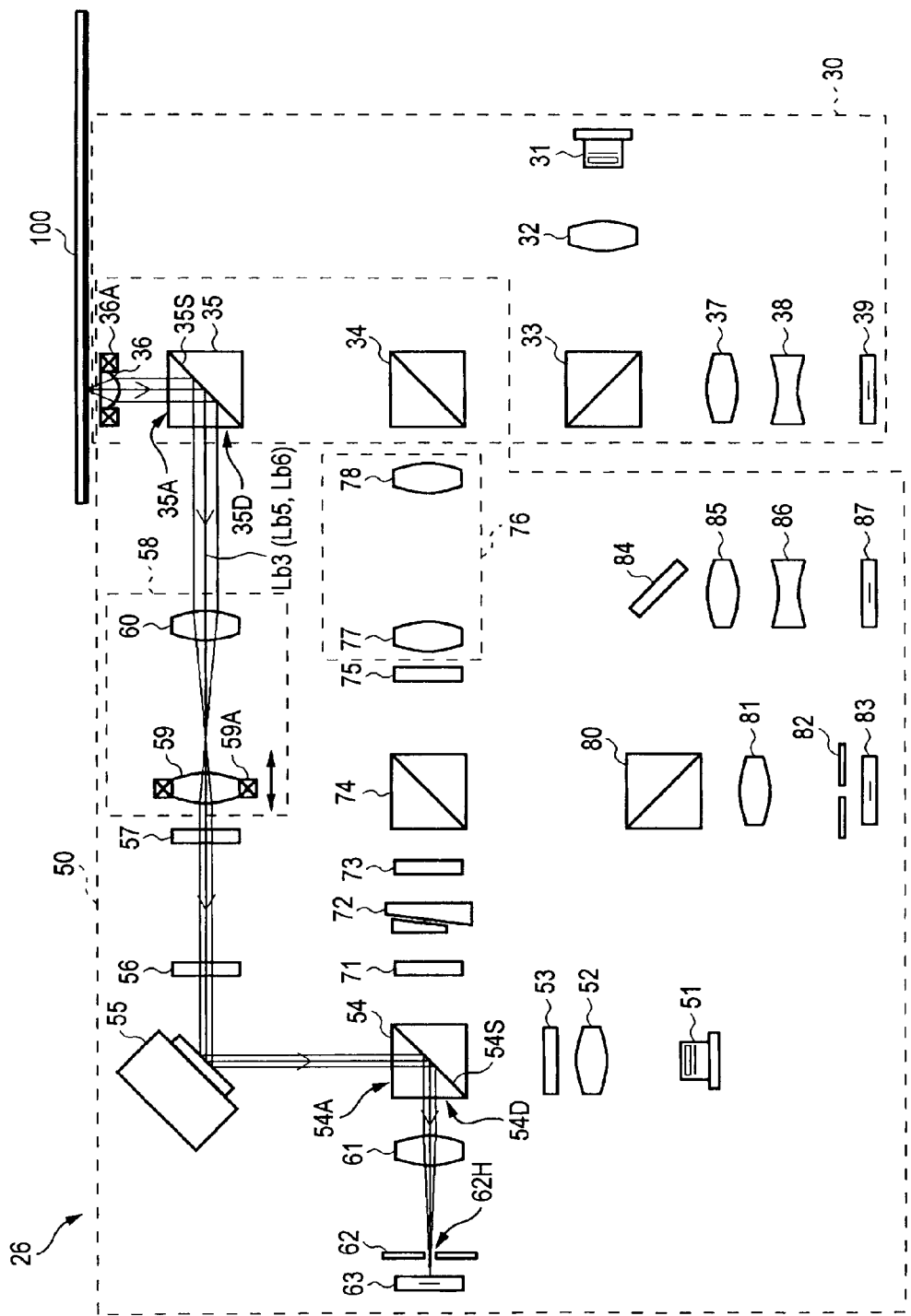
FIG. 12 is a schematic view showing the light path (3) of a blue light beam according to the first embodiment.

As shown in FIG. 12 corresponding to FIGS. 7 and 10, the blue light beam Lb3 is converted into a parallel light beam using the objective lens 36 so as to follow the blue light path 1 of the blue light beam Lb1 (FIG. 10) in the opposite direction and then enters the face 35A of the unpolarized beam splitter 35.

Since the blue light beam Lb2 was a left-handed circularly polarized light beam when irradiated from the objective lens 36 to the optical disc 100, the light beam is converted into a right-handed circularly polarized light beam when reflected by the reflection film 105 of the optical disc 100. In other words, the blue light beam Lb3 enters the unpolarized beam splitter 35 in the right-handed circularly polarization state.

The unpolarized beam splitter 35 causes the blue light beam Lb3 to be reflected by the reflection/transmission film 35S and to enter the relay lens 58 from the face 35D. At this time, the circular polarization direction of the blue light beam Lb3 is inverted at the reflection/transmission film 35S. For example, the polarization direction is converted from right-handed circularly polarization into left-handed circularly polarization.

The relay lens 58 causes the blue light beam Lb3 to enter the quarter wavelength plate 57 via the fixed lens 60 and the moving lens 59 sequentially. The quarter wavelength plate 57 converts the blue light beam Lb3 from a left-handed circularly polarized light beam to a linearly polarized light beam (s-polarization light beam), for example, and the blue light beam Lb3 is irradiated to the galvanometer mirror 55 via the liquid-crystal panel 56. The galvanometer mirror 55 causes the blue light beam Lb3 to be reflected by the mirror face 55A and to enter the face 54A of the polarization beam splitter 54.

The polarization beam splitter 54 causes the blue light beam Lb3, an s-polarization light beam, to be reflected by the reflection/transmission film 54S, to be emitted from the face 54D and to enter the condensing lens 61.

The condensing lens 61 causes the blue light beam Lb3 to converge and to be irradiated to a photodetector 63 via a pinhole plate 62 provided with a pinhole 62H having a predetermined diameter. The photodetector 63 detects the amount of the blue light beam Lb3, generates a detection signal SD1 depending on the amount of the light detected at this time and supplies the detection signal to the signal processing section 23 (FIG. 6) (the details will be described later). The light path that the blue light beam Lb3 follows is hereafter referred to as the blue light path 3.

(2-3-2-4) Light Path (4) of Blue Light Beam

In the information optical system 50, the focus Fb1 may not be aligned with the focus Fb2 by simply moving the moving lenses 59 and 77 mutually complementarily due to errors and the like in various optical components. Hence, the information optical system 50 is configured so as to correct the position of the moving lens 77 depending on the deviation amounts of the focuses Fb1 and Fb2.

After the blue light beam Lb1 shown in FIG. 10 is focused on the focus Fb1, the light beam becomes a divergent light beam and is reflected by the reflection film 105 of the optical disc 100 (FIG. 5A). At this time, the circular polarization direction of the blue light beam Lb1 is inverted at the reflection/transmission film 35S. For example, the polarization direction is converted from left-handed circularly polarization into right-handed circularly polarization (the light beam obtained after the blue light beam Lb1 is reflected is hereafter referred to as the blue light beam Lb3.)

Figure 13:
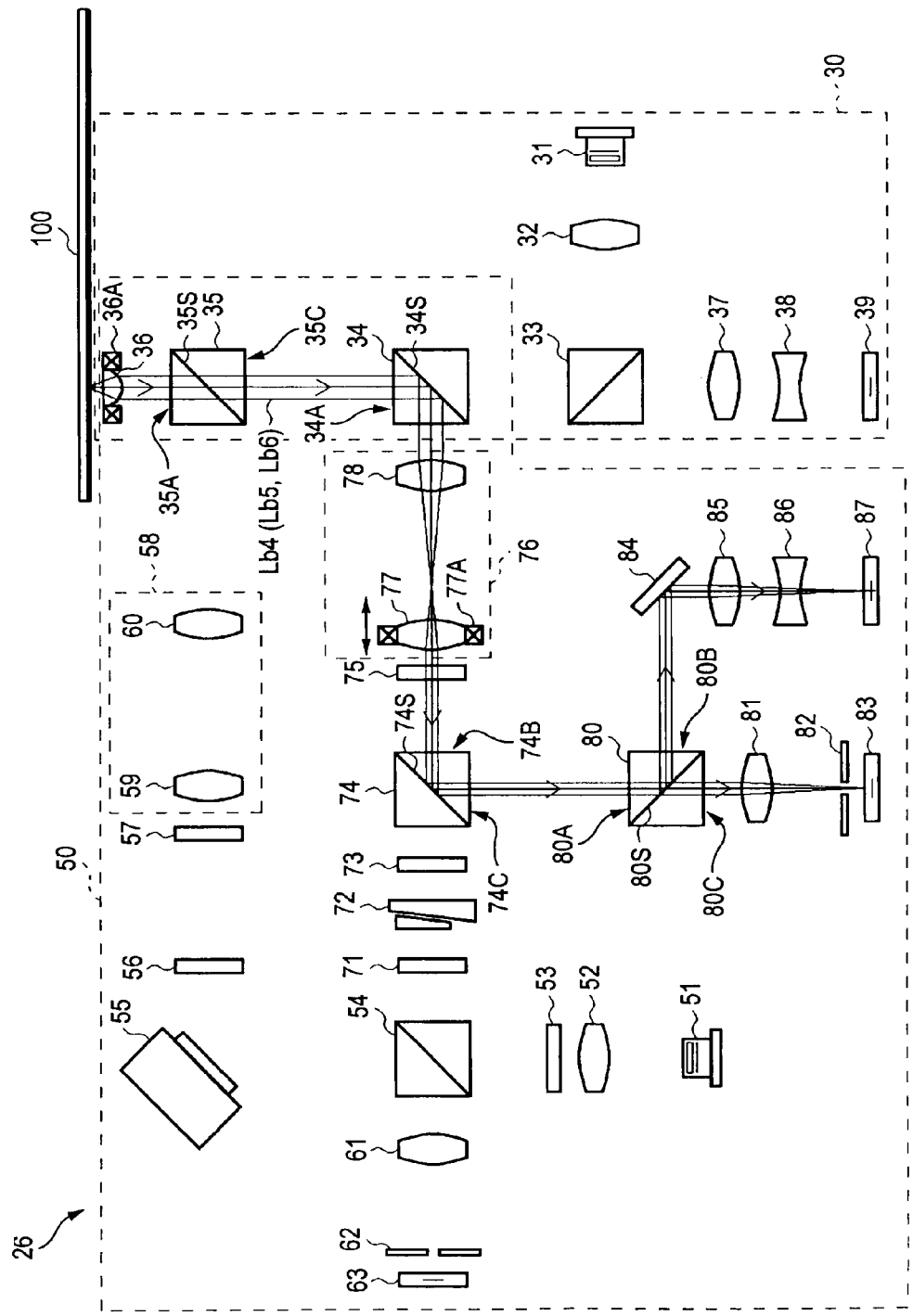
FIG. 13 is a schematic view showing the light path (4) of a blue light beam according to the first embodiment.

As shown in FIG. 13 corresponding to FIGS. 7 and 11, the blue light beam Lb4 is then converted into a parallel light beam using the objective lens 36 so as to follow the blue light path 2 (FIG. 11) in the opposite direction, and part of the parallel light beam is transmitted via the unpolarized beam splitter 35 and enters the face 34A of the dichroic prism 34.

The dichroic prism 34 causes the blue light beam Lb4 to be reflected by the reflection/transmission film 34S, to be emitted from the face 34D and to enter the relay lens 76. At this time, the circular polarization direction of the blue light beam Lb4 is inverted at the reflection/transmission film 34S. For example, the polarization direction is converted from right-handed circularly polarization into left-handed circularly polarization.

The relay lens 76 causes the blue light beam Lb4 to enter the quarter wavelength plate 75 via the fixed lens 78 and the moving lens 77 sequentially. The quarter wavelength plate 75 converts the blue light beam Lb4 from a left-handed circularly polarized light beam to a linearly polarized light beam (s-polarization light beam), for example, and the blue light beam Lb4 enters the face 74B of the polarization beam splitter 74.

The polarization beam splitter 74 causes the blue light beam Lb4 to be reflected by the reflection/transmission face 74S on the basis of the polarization direction (s-polarization) of the blue light beam Lb4 and to enter the face 80A of an unpolarized beam splitter 80 from the face 74C.

The unpolarized beam splitter 80 causes part of the blue light beam Lb4 to be reflected by the reflection/transmission face 80S and to be emitted from the face 80B. Furthermore, the blue light beam Lb4 is reflected by a mirror 84 and enters a condensing lens 85. The condensing lens 85 condenses the blue light beam Lb4. The blue light beam Lb4 is provided with astigmatism using a cylindrical lens 86 and enters a photodetector 87.

In the information optical system 50, the optical positions of various optical components are adjusted so that the amount of the deviation of the focus Fb2 of the blue light beam Lb2 with respect to the focus Fb1 of the blue light beam Lb1 inside the recording layer 101 is matched with the irradiation state at the time when the blue light beam Lb4 is condensed by the condensing lens 85 and irradiated to the photodetector 87.

Figure 14:
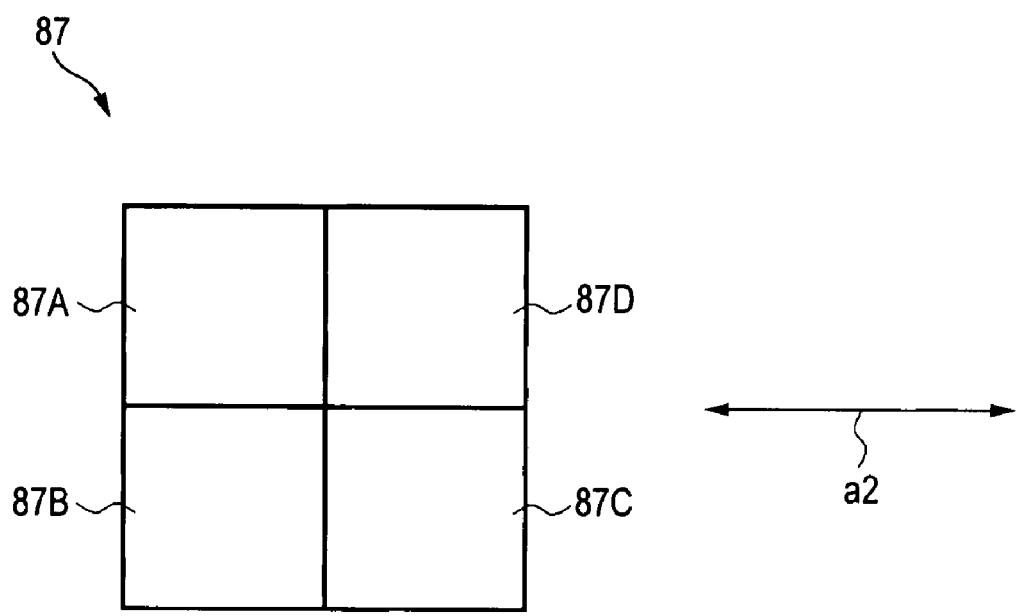
FIG. 14 is a schematic view showing the configuration (2) of the detection area of a photodetector.

As shown in FIG. 14, just like the photodetector 39 (FIG. 9), the photodetector 87 has four lattice-like divided detection portions 87A, 87B, 87C and 87D on its face to which the blue light beam Lb4 is irradiated. The direction (the horizontal direction in the figure) indicated by arrow a2 corresponds to the track traveling direction when the blue light beam Lb4 is irradiated to the reflection/transmission film 104 (FIG. 5A).

The photodetector 87 detects part of the blue light beam Lb4 in each of the detection portions 87A, 87B, 87C and 87D, generates detection signals SDAb, SDBb, SDCb and SDDb depending on the amount of light detected at this time, and sends these signals to the signal processing section 23 (FIG. 4).

The signal processing section 23 is configured so as to carry out focus control using the so-called astigmatism method. The signal processing section 23 calculates a focus error signal SFEb according to the following expression (5) and supplies this signal to the drive control section 22.

$$SFEb=(SDAb+SDCb)-(SDBb+SDDb) \quad (5)$$

This focus error signal SFEb denotes the amount of the deviation in the focus direction between the focus Fb1 of the blue light beam Lb1 and the focus Fb2 of the blue light beam Lb2.

Furthermore, the signal processing section 23 is also configured so as to carry out tracking control (also referred to as radial control) using a push-pull signal. The signal processing section 23 calculates a tracking error signal STEb according to the following expression (6) and supplies this signal to the drive control section 22.

$$STEb=(SDAb+SDDb)-(SDBb+SDCb) \quad (6)$$

This tracking error signal STEb denotes the amount of the deviation in the tracking direction (the so-called radial direction) between the focus Fb1 of the blue light beam Lb1 and the focus Fb2 of the blue light beam Lb2.

Furthermore, the signal processing section 23 is also configured so as to generate a tangential error signal that may be necessary for tangential control. This tangential control is carried out to move the focus Fb2 of the blue light beam Lb2 to the target position in the tangential direction (the tangential direction of the track).

More specifically, the signal processing section 23 is configured so as to carry out the tangential control using a push-pull signal. The signal processing section 23 calculates a tangential error signal SNEb according to the following expression (7) and supplies this signal to the drive control section 22.

$$SNEb=(SDAb+SDBb)-(SDCb+SDDb) \quad (7)$$

This tangential error signal SNEb denotes the amount of the deviation in the tangential direction between the focus Fb1 of the blue light beam Lb1 and the focus Fb2 of the blue light beam Lb2.

Accordingly, the drive control section 22 moves the moving lens 77 of the relay lens 76 on the basis of the focus error signal SFEb, thereby carrying out feedback control to reduce the amount of the deviation of the focus Fb2 of the blue light beam Lb2 in the focus direction with respect to the focus Fb1 of the blue light beam Lb1.

Furthermore, the drive control section 22 generates a tracking drive signal STDb on the basis of the tracking error signal STEb, also generates a tangential drive signal SNDb on the basis of the tangential error signal SNEb, and supplies the tracking drive signal STDb and the tangential drive signal SNDb to the galvanometer mirror 55, thereby carrying out tracking control and tangential control to adjust the angle of the reflection face 55A of the galvanometer mirror 55 so that the amounts of the deviation of the focus Fb2 of the blue light beam Lb2 in the tracking direction and the tangential direction with respect to the focus Fb1 of the blue light beam Lb1 are reduced.

As described above, the information optical system 50 is configured such that the blue light beam Lb4 generated when the blue light beam Lb1 is reflected by the reflection face 105 of the optical disc 100 is received and such that the result of receiving the light beam is supplied to the signal processing section 23. In response to this, the drive control section 22 adjusts the deviation in the focus direction using the moving lens 76 of the relay lens 76 so that the focus Fb2 of the blue light beam Lb2 is aligned with the focus Fb1 of the blue light beam Lb1. Furthermore, the drive control section 22 carries out tracking control and tangential control using the galvanometer mirror 55.

In addition, the unpolarized beam splitter 80 causes part of the blue light beam Lb4 to be transmitted by the reflection/transmission face 80S and to enter a condensing lens 81 from the face 80B. The condensing lens 81 causes the blue light beam Lb4 to converge and to be irradiated to a photodetector 83 via a pinhole plate 82 provided with a pinhole 82H having a predetermined diameter.

The photodetector 83 detects the amount of the blue light beam Lb4, generates a detection signal SD2 depending on the amount of the light detected at this time and supplies the detection signal to the signal processing section 23 (FIG. 6) (the details will be described later). The light path that the blue light beam Lb4 follows is hereafter referred to as the blue light path 4.

(2-4) Information Recording and Reproduction

Next, the operation performed when the optical disc apparatus 20 records information on the optical disc 100 and the operation performed when the optical disc apparatus 20 reproduces information from the optical disc 100 will be described below.

(2-4-1) Information Recording

When information is recorded on the optical disc 100, the control section 21 (FIG. 6) of the optical disc apparatus 20 receives an information recording instruction, recording information and recording address information from an external apparatus (not shown) or the like as described above, and supplies a drive instruction and the recording address information to the drive control section 22 and also supplies the recording information to the signal processing section 23.

At this time, the drive control section 22 causes the red light beam Lr1 to be irradiated from the face 100A of the optical disc 100 using the position-controlling optical system 30 (FIG. 8) of the optical pickup 26, and carries out focus control and tracking control (position control) for the objective lens 36 on the basis of the result of the detection of the red reflection light beam Lr2, a reflection light beam of the red light beam Lr1, thereby causing the focus Fr of the red light beam Lr1 to follow the target track corresponding to the recording address information.

Furthermore, the control section 21 causes the blue light beam Lb1 to be irradiated from the face 100A of the optical disc 100 using the information optical system 50 (FIG. 7). At this time, the focus Fb1 of the blue light beam Lb1 is condensed by the objective lens 36, the position of which is controlled, whereby the focus Fb1 is positioned on the back side of the target track.

Moreover, the control section 21 adjusts the position of the moving lens 59 of the relay lens 58 so that the depth d of the focus Fb1 (FIG. 5A) is aligned with the target depth. As a result, the focus Fb1 of the blue light beam Lb1 is aligned with the position of the target mark.

Still further, the control section 21 adjusts the position of the moving lens 77 of the relay lens 76 according to the position of the moving lens 59 of the relay lens 58 to adjust the depth d of the focus Fb2 (FIG. 5A) of the blue light beam Lb2. As a result, the depth of the focus Fb2 of the blue light beam Lb2 is aligned with the depth d of the focus Fb1 of the blue light beam Lb1, assuming that surface fluctuation of the optical disc 100 and errors in various optical components have not occurred.

Additionally, the control section 21 causes the photodetector 87 to detect the blue light beam Lb3 that is obtained when the blue light beam Lb1 is reflected by the reflection film 105 of the optical disc 100. On the basis of the result of the detection, the control section 21 causes the drive control section 22 to adjust the position of the moving lens 77 so that the deviation between the focus Fb2 of the blue light beam Lb2 and the focus Fb1 of the blue light beam Lb1 is reduced, and also causes the galvanometer mirror 55 to carry out tracking control and tangential control.

As a result, the focus Fb2 of the blue light beam Lb2 is aligned with the focus Fb1 of the blue light beam Lb1, that is, the position of the target mark.

Besides, the control section 21 causes the optical compensator 72 to adjust the light path length of the blue light beam Lb2 using the difference in refraction index, thereby suppressing the difference in the light path length between the blue light beams Lb1 and Lb2 to the coherent length or less.

Hence, the control section 21 of the optical disc apparatus 20 can form a favorable recording mark RM at the target mark position inside the recording layer 101 of the optical disc 100 using the optical pickup 26.

The signal processing section 23 (FIG. 6) generates a recording signal representing binary data, 0 or 1, for example, on the basis of the recording information supplied from an external apparatus (not shown) or the like. Accordingly, for example, the laser diode 51 emits the blue light beam Lb0 when the recording signal is "1", and does not emit the blue light beam Lb0 when the recording signal is "0".

Consequently, in the optical disc apparatus 20, when the recording signal is "1", the recording mark RM is formed at the target mark position inside the recording layer 101 of the optical disc 100, and when the recording signal is "0", the recording mark RM is not formed at the target mark position. For this reason, it is possible to record the value of the recording signal, "1" or "0", at the target mark position depending on the presence or absence of the recording mark RM. As a result, it is possible to record the recording information on the recording layer 101 of the optical disc 100.

(2-4-2) Information Reproduction

When information is reproduced from the optical disc 100, the control section 21 (FIG. 6) of the optical disc apparatus 20 causes the red light beam Lr1 to be irradiated from the face 100A of the optical disc 100 using the position-controlling optical system 30 of the optical pickup 26. On the basis of the detection result of the red reflection light beam Lr2, a reflected light beam of the red light beam Lr1, the control section 21 causes the drive control section 22 to carry out focus control and tracking control (position control) for the objective lens 36.

Furthermore, the control section 21 causes the blue light beam Lb1 to be irradiated to the optical disc 100 using the information optical system 50 (FIG. 7). At this time, the focus Fb1 of the blue light beam Lb1 is condensed by the objective lens 36, the position of which is controlled, whereby the focus Fb1 is positioned on the back side of the target track.

Moreover, the control section 21 adjusts the position of the moving lens 59 of the relay lens 58 so that the depth d1 of the focus Fb1 is adjusted to a first target depth as shown in FIG. 5B. As a result, the focus Fb1 of the blue light beam Lb1 is aligned with the first target mark position PS1.

Hence, the first recording mark RM1 recoded at the first target mark position PS1 acts as a hologram and a blue reproduction light beam Lb5 serving as the so-called reproduction light is generated on the side of the face 100A.

The control section 21 suppresses the emission power of the laser diode 51 during reproduction, thereby preventing the recording mark RM from being deleted erroneously by the blue light beam Lb1.

Furthermore, the control section 21 causes the blue light beam Lb2 as well as the blue light beam Lb1 to be irradiated to the optical disc 100 using the information optical system 50. At this time, just like the focus Fb1 of the blue light beam Lb1, the focus Fb2 of the blue light beam Lb2 is condensed by the objective lens 36, the position of which is controlled, whereby the focus Fb2 is positioned on the back side of the target track.

Moreover, the control section 21 adjusts the position of the moving lens 77 of the relay lens 76 independently without being related to the position of the moving lens 59 of the relay lens 58 so that the depth d2 of the focus Fb2 is adjusted to a second target depth different from the depth d1 of the focus Fb1 as shown in FIG. 5B. As a result, the focus Fb2 of the blue light beam Lb2 is aligned with the second target mark position.

Hence, the second recording mark MR2 recoded at the second target mark position acts as a hologram and a blue reproduction light beam Lb6 serving as the so-called reproduction light is generated on the side of the face 100A.

In other words, in the information optical system 50, the blue light beams Lb1 and Lb2 are irradiated at the same time so that the focuses Fb1 and Fb2 thereof are focused on the first and second target mark positions being different from each other.

As a result, the information optical system 50 can generate the blue reproduction light beams Lb5 and Lb6 from the first and second recording marks RM1 and RM2 located at the first and second target mark positions inside the recording layer 101 of the optical disc 100, respectively.

At this time, the objective lens 36 of the information optical system 50 (FIG. 12) converts the blue reproduction light beams Lb5 and Lb6, being mixed, into parallel light beams and causes the parallel light beams to enter the face 35A of the unpolarized beam splitter 35.

The unpolarized beam splitter 35 causes part of the blue reproduction light beams Lb5 and Lb6, being mixed, to be reflected by the reflection/transmission film 35S, to be emitted from the face 35D and to enter the condensing lens 61 via the blue light path 3.

Figure 15A:
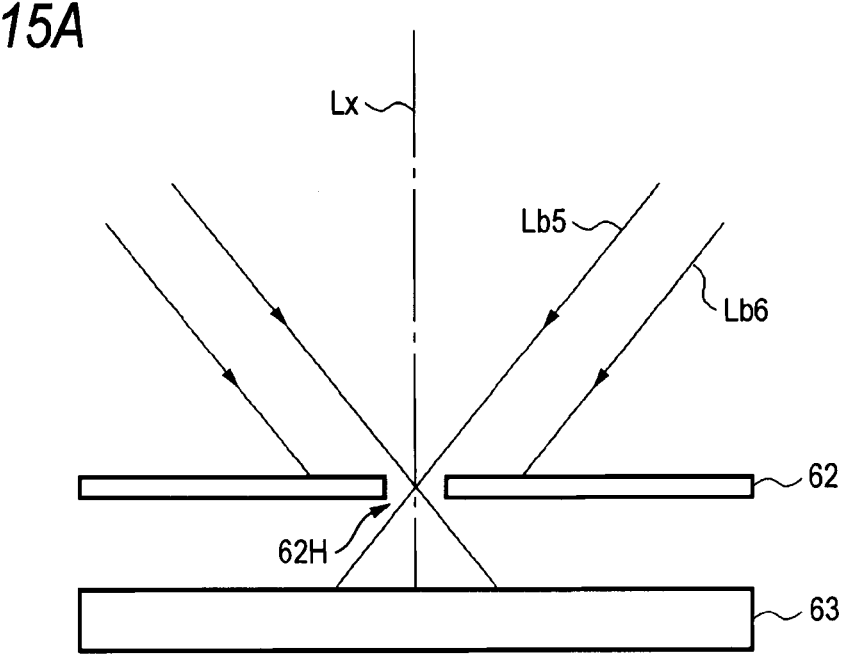
FIGS. 15A and 15B are schematic views showing how light beams are selected using a pinhole.

The condensing lens 61 condenses the blue reproduction light beams Lb5 and Lb6. As shown in FIG. 15A, the pinhole plate 62 is disposed such that the focus of the blue reproduction light beam Lb5 is positioned inside the pinhole 62H, thereby allowing the blue reproduction light beam Lb5 to pass therethrough and to be irradiated to the photodetector 63.

On the other hand, the pinhole plate 62 blocks most of the blue reproduction light beam Lb6, the focus of which is not formed inside the pinhole 62H, thereby practically preventing the blue reproduction light beam Lb6 from being irradiated to the photodetector 63.

As a result, the photodetector 63 can detect the amount of the blue reproduction light beam Lb5, generate the detection signal SD1 depending on the amount of the light beam detected at this time and supply this signal to the signal processing section 23 (FIG. 6).

Furthermore, the unpolarized beam splitter 35 causes part of the blue reproduction light beams Lb5 and Lb6, being mixed, to be transmitted through the reflection/transmission film 35S (FIG. 13), to be emitted from the face 35C and to enter the condensing lens 81 via the blue light path 4.

Figure 15B:
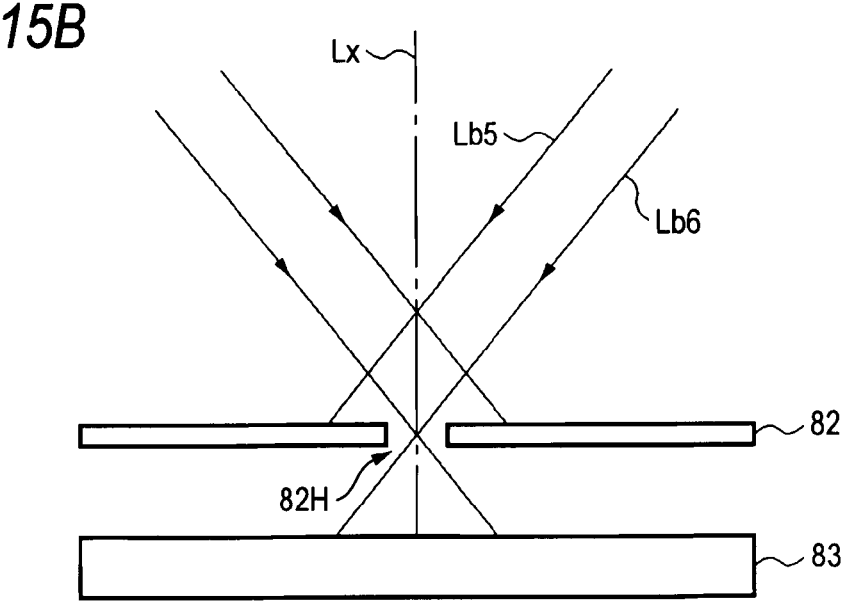

The condensing lens 81 condenses the blue reproduction light beams Lb5 and Lb6. As shown in FIG. 15B, the pinhole plate 82 is disposed such that the focus of the blue reproduction light beam Lb6 is positioned inside the pinhole 82H, thereby allowing the blue reproduction light beam Lb6 to pass therethrough and to be irradiated to the photodetector 83.

On the other hand, the pinhole plate 82 blocks most of the blue reproduction light beam Lb5, the focus of which is not formed inside the pinhole 82H, thereby practically preventing the blue reproduction light beam Lb5 from being irradiated to the photodetector 83, in a way opposite to that of the pinhole plate 62.

As a result, the photodetector 83 can detect the amount of the blue reproduction light beam Lb6, generate the detection signal SD2 depending on the amount of the light beam detected at this time and supply this signal to the signal processing section 23 (FIG. 6).

In the optical disc apparatus 20, when the recording mark RM is not recorded at the target mark position, the blue reproduction light beam Lb5 or Lb6 is not generated from the target mark position, and the information optical system 50 generates a detection signal indicating that the blue reproduction light beam Lb5 or Lb6 is not received.

Accordingly, on the basis of this detection signal, the signal processing section 23 recognizes whether the blue reproduction light beam Lb5 or Lb6 is detected or not according to the value of "1" or "0", and generates reproduction information on the basis of the result of the recognition.

Hence, in the optical disc apparatus 20, when the recording mark RM is formed at the target mark position inside the recording layer 101 of the optical disc 100, the blue reproduction light beam Lb5 or Lb6 is received. When the recording mark RM is not formed at the target mark position, neither the blue reproduction light beam Lb5 nor Lb6 is received. As a result, it is possible to recognize independently whether "1", or "0" is recorded at the respective corresponding target mark position.

As described above, the optical pickup 26 causes the blue light beams Lb1 and Lb2 serving as the so-called reference light beams to be focused on the first and second recording marks RM1 and RM2, respectively, inside the recording layer 101 of the optical disc 100, thereby generating the blue reproduction light beams Lb5 and Lb6 serving as the so-called reproduction light beams, respectively. The photodetectors 63 and 83 detect the amounts of the light beams via the blue light paths 3 and 4, respectively, and the detection signals SD1 and SD2 are generated depending on the presence or absence of the recording marks RM.

The signal processing section 23 then subjects the detection signals SD1 and SD2 to various signal processing, such as demodulation or decoding processing described above, thereby generating pieces of reproduction information respectively corresponding thereto and supplying the pieces of reproduction information to the control section 21.

The control section 21 integrates the multiple pieces of reproduction information into one piece of reproduction information using predetermined information integrating processing and supplies the one piece of reproduction information to an external apparatus (not shown). As a result, the optical disc apparatus 20 can obtain apparently twice the reproduction speed by simply carrying out reproduction at the ordinary reproduction speed using the blue reproduction light beams Lb5 and Lb6.

It may be possible that the optical disc apparatus 20 daringly reproduces information on the basis of only one channel of reproduction information obtained using the blue light beams Lb1 and the blue reproduction light beam Lb5 by controlling the liquid-crystal panel 71 so as to block the blue light beam Lb2 and the blue reproduction light beam Lb6, for example.

(2-5) Operation and Effect

With the above-mentioned configuration, in both cases that information is recorded on the optical disc 100 and that information is reproduced from the optical disc 100, the control section 21 (FIG. 6) of the optical disc apparatus 20 according to the first embodiment causes the position-controlling optical system 30 (FIG. 8) of the optical pickup 26 to carry out focus control and tracking control for the objective lens 36 so that the focus Fr of the red light beam Lr1 is focused on the target track on the reflection/transmission film 104 (FIGS. 5A and 5B) of the optical disc 100.

Furthermore, when information is recorded on the optical disc 100, the control section 21 complementarily controls the positions of the moving lenses 59 and 77 of the relay lenses 58 and 76 using the two blue light beams Lb1 (FIG. 10) and Lb2

(FIG. 11) so that the focuses Fb1 and Fb2 of the blue light beams Lb1 and Lb2 are aligned with a target mark position (FIG. 5A), thereby forming the recording mark RM inside the recording layer 101 of the optical disc 100.

On the other hand, when information is reproduced from the optical disc 100, the control section 21 independently controls the positions of the moving lenses 59 and 77 of the relay lenses 58 and 76 so that the focuses Fb1 and Fb2 of the two blue light beams Lb1 and Lb2 are aligned with target mark positions (FIG. 5B) being different from each other, respectively, thereby generating the blue reproduction light beams Lb5 and Lb6 from the first and second recording marks RM1 and RM2 positioned at the depths d1 and d2 inside the recording layer 101 of the optical disc 100, respectively.

At this time, the control section 21 detects the amounts of the blue reproduction light beams Lb5 and Lb6 using the photodetectors 63 and 83, respectively, and integrates the two channels of reproduction signals obtained by carrying out predetermined signal processing, thereby generating one reproduction signal having twice the reproduction speed.

Hence, although the control section 21 of the optical disc apparatus 20 can record only one recording mark RM at a time because of restriction in the principle of information recording using holograms during information recording, the control section 21 can obtain two channels of reproduction signals during information reproduction by simultaneously generating the blue reproduction light beams Lb5 and Lb6 from two recording marks, i.e., the first and second recording marks RM1 and RM2, respectively. By integrating these signals, the control section 21 can obtain a reproduction signal having twice the reproduction speed.

Although the control section 21 controls the positions of the moving lenses 59 and 77 of the relay lenses 58 and 76 complementarily with each other during information recording, the control section 21 can align the focuses Fb1 and Fb2 of the blue light beams Lb1 and Lb2 with the first and second target mark positions PS1 and PS2, respectively, by simply controlling the positions of the moving lenses 59 and 77 independently of each other during information reproduction. It may therefore be not necessary to additionally provide optical components configured to adjust the focuses Fb1 and Fb2 independently of each other.

Hence, in the optical disc apparatus 20, even when the upper limit of the reproduction speed is inevitably determined by the upper limit of the rotation speed of the optical disc 100 due to the physical strength and the surface fluctuation and the like of the optical disc 100 during high-speed rotation, the apparent reproduction speed can be raised approximately twice by reading two channels of information simultaneously and by integrating them.

Since two channels of blue light beams, i.e., the blue light beams Lb1 and Lb2, may be fundamentally necessary in principle when the recording mark RM is recorded on the optical disc 100, the optical disc apparatus 20 has two channels of optical systems, such as the blue light paths 1 and 2, beforehand. For this reason, it may not be necessary to provide any additional optical system when the optical disc apparatus 20 carries out simultaneous reproduction of the two channels. It may thus be possible to effectively use the other optical system that is not used when only one optical system is used for information reproduction.

For example, by dividing the channel for information to be recorded into two channels and by recording the two channels of information obtained after the division and corresponding to each other at the target mark positions having different depths in the same target track during information recording, the control section 21 of the optical disc apparatus 20 can obtain the original information by integrating the two channels of information obtained during reproduction.

With the configuration described above, in the control section 21 of the optical disc apparatus 20 according to the first embodiment, when information is recorded on the optical disc 100, both the focuses Fb1 and Fb2 of the two blue light beams Lb1 and Lb2 are aligned with a target mark position and interfered with each other to form the recording mark RM. On the other hand, when information is reproduced from the optical disc 100, the focuses Fb1 and Fb2 of the two blue light beams Lb1 and Lb2 are aligned with target mark positions being different from each other, whereby the blue reproduction light beams Lb5 and Lb6 can be generated from the first and second recording marks RM1 and RM2 disposed at the positions being different from each other inside the recording layer 101 of the optical disc 100, and two channels of reproduction signals are obtained. By integrating these two channels of the reproduction signals, the control section 21 can generate one reproduction signal having twice the reproduction speed.

(3) Second Embodiment (3-1) Configuration of Optical Disc

The external view of an optical disc 200 according to this embodiment is almost the same as that of the optical disc 100 (FIG. 4) according to the first embodiment.

It is assumed that instead of the red light beam Lr1 irradiated to the optical disc 100, a blue light beam Lb11 is irradiated to this optical disc 200 and focused on the target track.

In actuality, as shown in a sectional view of FIG. 16A in which the same letters and numerals are given to portions corresponding to those in FIG. 5A, the optical disc 200 is different from the optical disc 100 in that the optical disc 200 has a reflection/transmission film 204 instead of the reflection/transmission film 104.

Like the reflection/transmission film 104, the reflection/transmission film 204 has a spiral track formed thereon. On the other hand, unlike the reflection/transmission film 104, the reflection/transmission film 204 is made of a material that allows a predetermined ratio (for example, approximately 10%) of the blue light beam Lb to be reflected and the remainder (for example, approximately 90%) to be transmitted.

With this configuration, when information is recorded on the optical disc 200, although the transmission factors of the blue light beams Lb1 and Lb2 at the reflection/transmission film 204 partly become lower than those at the reflection/transmission film 104 of the optical disc 100, the recording mark RM is recorded using the blue light beams Lb1 and Lb2 in almost the same way as that of the optical disc 100.

Furthermore, when information is reproduced, just like the optical disc 100, the optical disc 200 generates blue reproduction light beams Lb3 and Lb4 from the recording marks RM1 and RM2 located at the focuses Fb1 and Fb2 of the blue light beams Lb1 and Lb2, respectively.

At this time, although the transmission factors of the blue reproduction light beams Lb3 and Lb4 at the reflection/transmission film 204 partly becomes lower than those at the reflection/transmission film 104 of the optical disc 100, the blue reproduction light beams Lb3 and Lb4 are emitted from the side of the substrate 102 as divergent light beams.

As described above, unlike the optical disc 100 according to the first embodiment, the optical disc 200 uses blue light beams for both position control and information recording in both cases of information recording and reproduction.

(3-2) Configuration of Optical Disc Apparatus

Next, an optical disc apparatus 120 adapted to the optical disc 200 described above will be described below. The optical disc apparatus 120 is different from the optical disc apparatus 20 according to the first embodiment shown in FIG. 6 in that the optical disc apparatus 120 is provided with a control section 121 instead of the control section 21 and that the optical disc apparatus 120 is provided with an optical pickup 126 instead of the optical pickup 26. However, the optical disc apparatus 120 is almost the same as the optical disc apparatus 20 are in other respects.

Just like the control section 21, the control section 121 is mainly formed of a CPU (not shown) The control section 121 reads various programs, such as basic programs and information recording programs, from a ROM and loads these programs into a RAM, thereby carrying out various processing, such as information recording processing.

Furthermore, just like the optical disc apparatus 20 according to the first embodiment, the optical disc apparatus 120 is configured such that the control section 121 controls the optical pickup 126. Hence, information is recorded at the position corresponding to the target track on the recording layer 101 of the optical disc 200, and information is reproduced from the position corresponding to the target track.

(3-3) Configuration of Optical Pickup

Next, the configuration of the optical pickup 126 will be described below. The optical pickup 126 has optical components, such as an unpolarized beam splitter 91 and a photodetector 93, instead of some of the optical components, such as the laser diode 31 and the photodetector 39, for the optical pickup 26, as shown in FIG. 17 in which the same numerals are given to components corresponding to those in FIG. 7.

In other words, the optical pickup 126 is different from the optical pickup 26 in that the optical pickup 126 has a position-controlling optical system 90 (FIG. 18) configured to carry out focus control and tracking control using blue light beams, instead of the position-controlling optical system 30, and that the optical pickup 126 also has an information optical system 98 (FIG. 19) corresponding to the information optical system 50 (FIG. 7).

(3-3-1) Configuration of Position-Controlling Optical System

Figure 17:
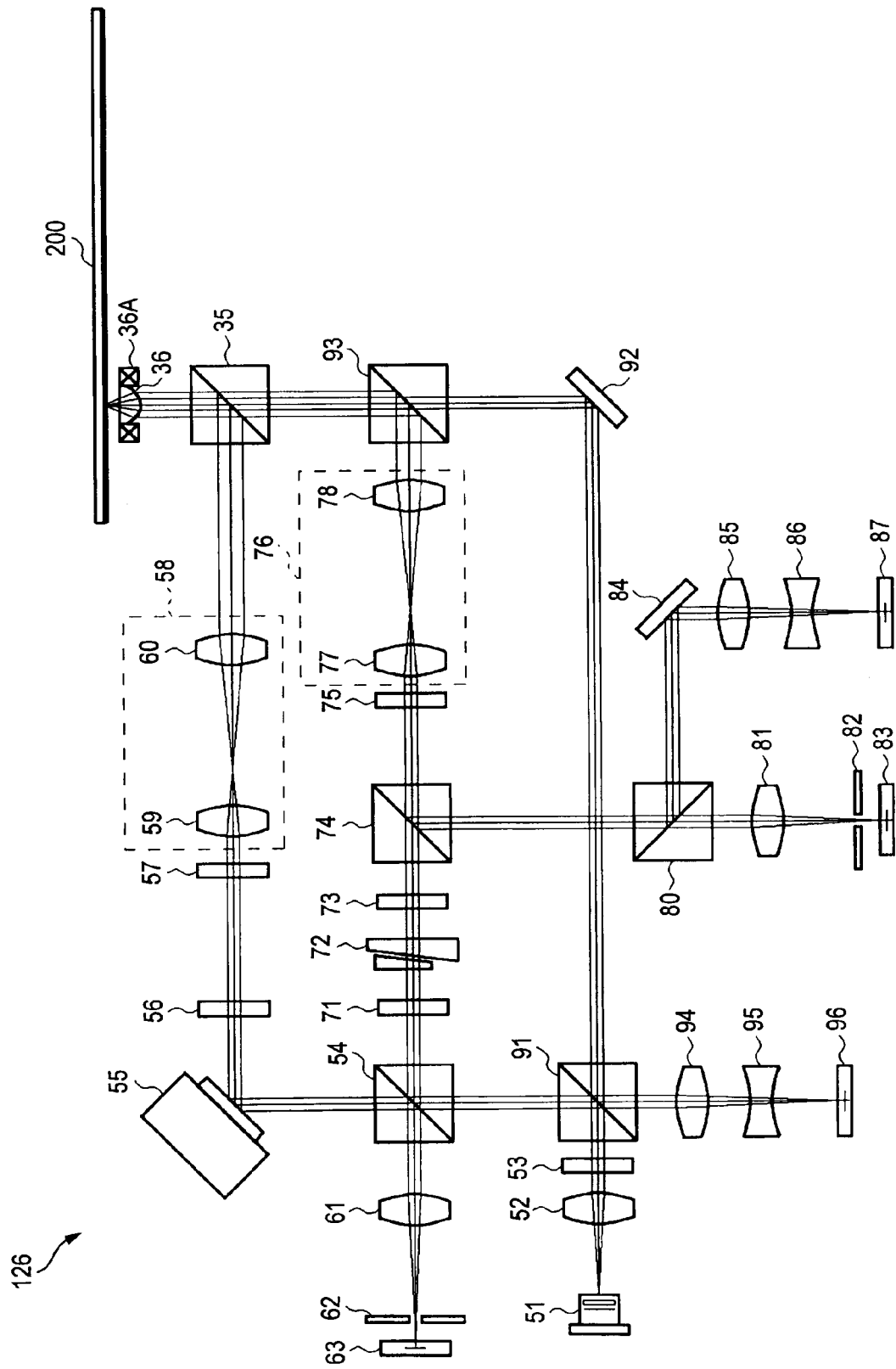
FIG. 17 is a schematic view showing the configuration of an optical pickup according to the second embodiment.
Figure 18:
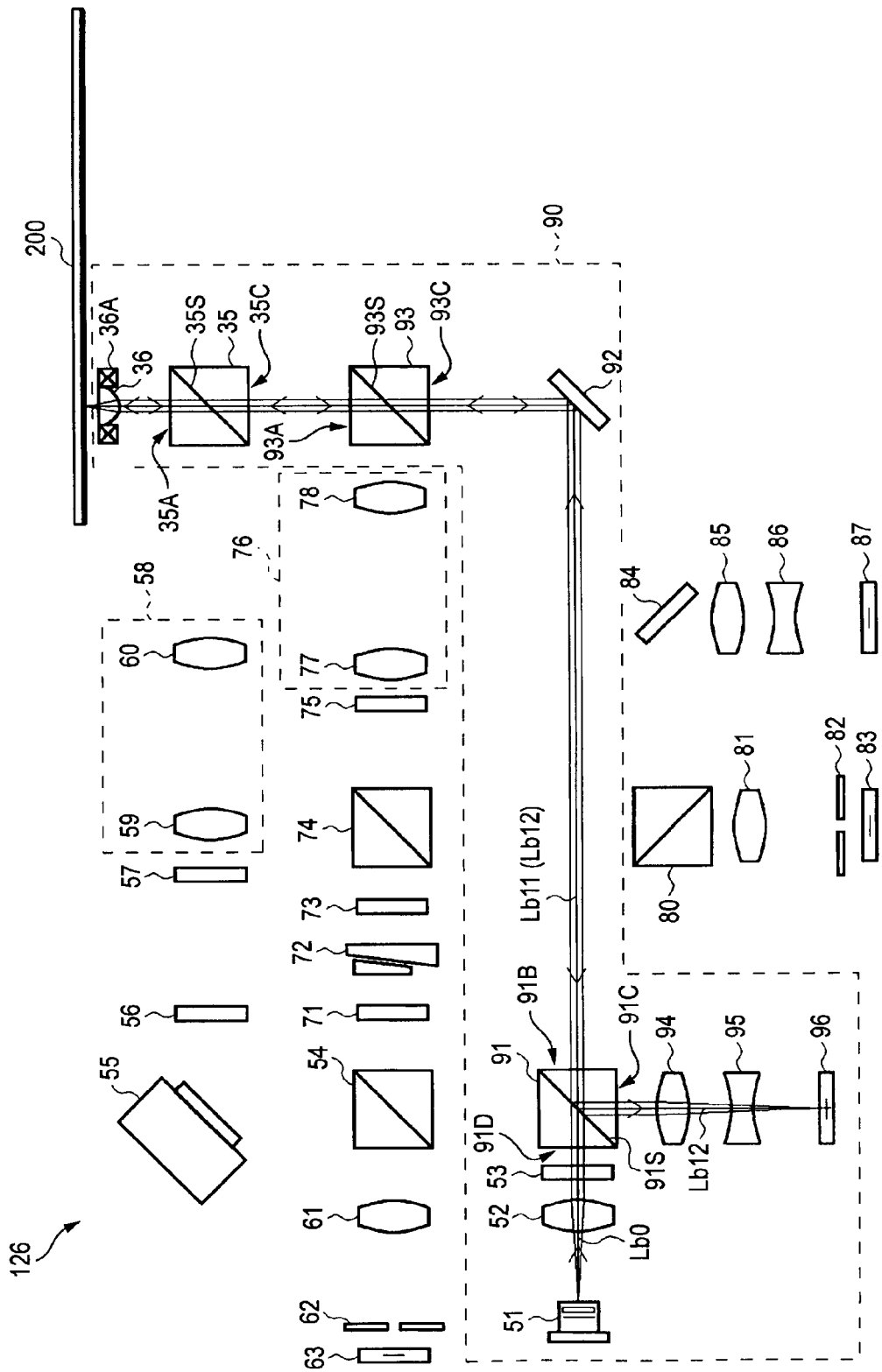
FIG. 18 is a schematic view showing the configuration of a position-controlling optical system according to the second embodiment.

As shown in FIG. 18 corresponding to FIG. 17, under the control of the control section 121 (FIG. 6), the laser diode 51 emits the blue light beam Lb0, a divergent light beam, to the collimator lens 52. The collimator lens 52 converts the blue light beam Lb0 from a divergent light beam to a parallel light beam and causes the parallel light beam to enter the half-wavelength plate 53.

The polarization direction of the blue light beam Lb0 is rotated by a predetermined angle using the half-wavelength plate 53, and the p-polarization component thereof becomes approximately 50% and the s-polarization component thereof becomes approximately 50%, for example. The blue light beam Lb0 then enters the face 91D of a polarization beam splitter 91.

The unpolarized beam splitter 91 causes the blue light beam Lb0 to be transmitted in a predetermined ratio (for example, 20%) at the reflection/transmission face 91S, thereby obtaining a blue light beam Lb11, and further causes this light beam to be emitted from the face 91B, to be reflected by a mirror 92 and to enter the face 93C of the unpolarized beam splitter 93.

The unpolarized beam splitter 93 causes the blue light beam Lb11 to be transmitted at a predetermined ratio (for example, 20%) at the reflection/transmission face 93S, to be emitted from the face 93A and to enter the face 35C of the unpolarized beam splitter 35.

The unpolarized beam splitter 35 causes part of the blue light beam Lb11 to be transmitted at the reflection/transmission face 35S, to be emitted from the face 35A and to enter the objective lens 36.

The objective lens 36 condenses the blue light beam Lb11, just like the red light beam Lr1 according to the first embodiment, and irradiates the light beam to the face 200A of the optical disc 200. At this time, as shown in FIG. 16A, the blue light beam Lb11 is transmitted through the substrate 102 and then reflected by the reflection/transmission film 204 in a predetermined ratio (for example, 10%). The reflected light beam becomes a blue light beam Lb12 that proceeds in a direction opposite to that of the blue light beam Lb11.

Then, the blue light beam Lb12 is converted into a parallel light beam by the objective lens 36, transmitted through the unpolarized beam splitter 35 and the unpolarized beam splitter 93 sequentially, reflected by the mirror 92 and enters the face 91B of the unpolarized beam splitter 91.

The unpolarized beam splitter 91 causes the blue light beam Lb12 to be reflected in a ratio of approximately 80%, to be emitted from the face 91C and to enter a condensing lens 94. The condensing lens 94 causes the blue light beam Lb12 to converge, and a cylindrical lens 95 causes the blue light beam Lb12 to have astigmatism and to be irradiated to a photodetector 96.

Just like the photodetector 39 according to the first embodiment, the photodetector 96 has four divided detection portions (not shown). Furthermore, just like the photodetector 39, the photodetector 96 generates four detection signals SDAc, SDBc, SDCc and SDDc, and sends these signals to the signal processing section 23 (FIG. 6).

Hence, the signal processing section 23 generates a focus error signal SFEc and a tracking error signal STEc just as in the case of the first embodiment, and supplies these signals to the drive control section 22.

The drive control section 22 causes the objective lens 36 to be feedback-controlled (focus-controlled) so that the blue light beam Lb11 is focused on the reflection/transmission film 204 of the optical disc 200 on the basis of the focus error signal SFEc.

Furthermore, the drive control section 22 causes the objective lens 36 to be feedback-controlled (tracking-controlled) so that the blue light beam Lb11 is focused on the target track on the reflection/transmission film 204 of the optical disc 200 on the basis of the tracking error signal STEc.

As described above, the position-controlling optical system 90 is configured such that the blue light beam Lb11 is used instead of the red light beam Lr1 according to the first embodiment and is irradiated to the reflection/transmission film 204 of the optical disc 200 and such that the result of receiving the blue light beam Lb12, i.e., the reflected light of the blue light beam Lb11, is supplied to the signal processing section 23. In response to this, the drive control section 22 carries out focus control and tracking control for the objective lens 36 so that the blue light beam Lb11 is focused on the target track of the reflection/transmission film 204.

(3-3-2) Configuration of Information Optical System

Figure 19:
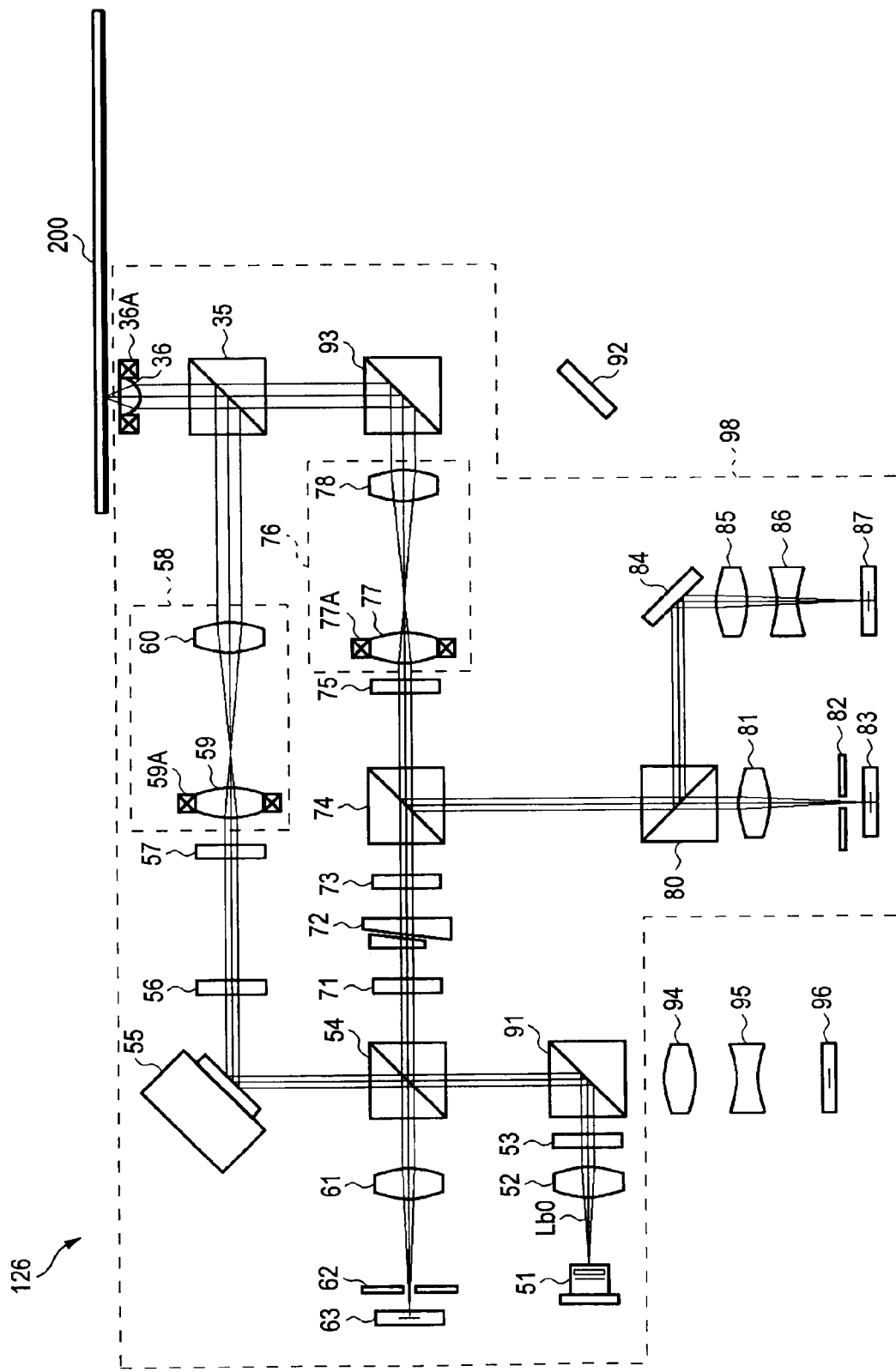
FIG. 19 is a schematic view showing the configuration of an information optical system according to the second embodiment.

As shown in FIG. 19 corresponding to FIG. 17, the information optical system 98 is different from the information optical system 50 according to the first embodiment in that the blue light beam Lb0 is reflected by the reflection/transmission face 91S of the unpolarized beam splitter 91 in a predetermined ratio and the reflected light beam, i.e., the blue light beam Lb10, enters the face 54C, instead of causing the blue light beam Lb0 to enter the face 54C of the unpolarized beam splitter 54. However, the information optical system 98 is similar to the information optical system 50 in other respects.

In other words, the information optical system 98 is configured such that the p-polarization component of the blue light beam Lb0 is transmitted through the reflection/transmission face 54S of the polarization beam splitter 54 to become the blue light beam Lb1 and such that the s-polarization component of the blue light beam Lb0 is reflected to become the blue light beam Lb2.

Just like the information optical system 50 according to the first embodiment, the information optical system 98 is configured so as to cause the blue light beam Lb1 to be irradiated to the optical disc 200 via a light path corresponding to the blue light path 1 (FIG. 10) and causes the blue light beam Lb2 to be irradiated to the optical disc 200 via a light path corresponding to the blue light path 2 (FIG. 11).

Furthermore, the information optical system 98 causes the blue light beam Lb3, a reflected light beam obtained when the blue light beam Lb2 is reflected by the optical disc 200, to enter the photodetector 63 via a light path corresponding to the blue light path 3 (FIG. 12). Still further, the information optical system 98 causes the blue light beam Lb4, a reflected light beam obtained when the blue light beam Lb1 is reflected by the optical disc 200, to enter the photodetector 83 via a light path corresponding to the blue light path 4 (FIG. 13).

Moreover, the information optical system 98 detects part of the blue light beam Lb4 using the photodetector 87. On the basis of this detection result, the signal processing section 23 and the drive control section 22 carry out feedback control to reduce the amount of the deviation of the focus Fb2 of the blue light beam Lb2 with respect to the focus Fb1 of the blue light beam Lb1 in the focus direction, and adjust (carry out tracking control and tangential control) the angle of the reflection face 55A of the galvanometer mirror 55 to reduce the amounts of the deviation of the focus Fb2 of the blue light beam Lb2 with respect to the focus Fb1 of the blue light beam Lb1 in the tracking direction (radial direction) and the tangential direction.

As described above, just like the information optical system 50 according to the first embodiment, the information optical system 98 is configured to guide the blue light beams Lb1 and Lb2 and the blue light beams Lb3 and Lb4.

(3-4) Information Recording and Reproduction

Next, the operation performed when the optical disc apparatus 120 records information on the optical disc 200 and the operation performed when the optical disc apparatus 120 reproduces information from the optical disc 200 will be described below.

When information is recorded on the optical disc 200, the control section 121 of the optical disc apparatus 120, being in a state of carrying out focus control and tracking control for the objective lens 36 using the blue light beam Lb11, causes the blue light beams Lb1 and Lb2 to be irradiated to the optical disc 200 and causes their focuses Fb1 and Fb2 to be aligned with the target mark position, thereby recording the recording mark RM.

Furthermore, when information is reproduced from the optical disc 200, the control section 121 of the optical disc apparatus 120 aligns the focus Fb1 of the blue light beam Lb1 with the first target mark position PS1, thereby generating the blue reproduction light beam Lb5 from the first recording mark RM1 and detecting the light beam.

Moreover, the control section 121 of the optical disc apparatus 120 aligns the focus Fb2 of the blue light beam Lb2 with the second target mark position PS2, thereby generating the blue reproduction light beam Lb6 from the second recording mark RM2 and detecting the light beam.

At this time, on the basis of the detection signals SD1 and SD2 corresponding to the presence and absence of the first and second recording marks RM1 and RM2, the signal processing section 23 generates pieces of reproduction information respectively corresponding thereto, and the control section 121 integrates the multiple pieces of reproduction information into one piece of reproduction information and supplies the one piece of information to an external apparatus (not shown). As a result, just like the optical disc apparatus 20 according to the first embodiment, the optical disc apparatus 120 can obtain apparently twice the reproduction speed.

(3-5) Operation and Effect

With the above-mentioned configuration, in both cases that information is recorded on the optical disc 200 and that information is reproduced from the optical disc 200, the control section 121 (FIG. 6) of the optical disc apparatus 120 according to the second embodiment causes the position-controlling optical system 90 (FIG. 18) of the optical pickup 126 to carry out focus control and tracking control for the objective lens 36 so that the focus Fb11 of the blue light beam Lb11 is focused on the target track on the reflection/transmission film 204 (FIGS. 16A and 16B) of the optical disc 200.

Furthermore, just as in the case of the first embodiment, when information is recorded on the optical disc 200, the control section 121 complementarily controls the positions of the moving lenses 59 and 77 of the relay lenses 58 and 76 via the actuators 59A and 77A so that the focuses Fb1 and Fb2 of the two blue light beams Lb1 and Lb2 are aligned with a target mark position (FIG. 16A), thereby forming the recording mark RM inside the recording layer 101 of the optical disc 200.

On the other hand, just as in the case of the first embodiment, when information is reproduced from the optical disc 200, the control section 121 independently controls the positions of the moving lenses 59 and 77 of the relay lenses 58 and 76 so that the focuses Fb1 and Fb2 of the two blue light beams Lb1 and Lb2 are aligned with target mark positions (FIG. 16B) being different from each other, respectively, thereby generating the blue reproduction light beams Lb5 and Lb6 from the first and second recording marks RM1 and RM2 positioned at the depths d1 and d2 inside the recording layer 101 of the optical disc 200, respectively.

At this time, the control section 121 detects the amounts of the blue reproduction light beams Lb5 and Lb6 using the photodetectors 63 and 83, respectively, and integrates the two channels of reproduction signals obtained by carrying out predetermined signal processing, thereby generating one reproduction signal having twice the reproduction speed.

Hence, just as in the case of the first embodiment, although the control section 121 of the optical disc apparatus 120 can record only one recording mark RM at a time because of restriction in the principle of information recording using holograms during information recording, the control section 121 can obtain two channels of reproduction signals during information reproduction by simultaneously generating the blue reproduction light beams Lb5 and Lb6 from two recording marks, i.e., the first and second recording marks RM1 and RM2, respectively. By integrating these signals, the control section 121 can obtain a reproduction signal having twice the reproduction speed.

In particular, when the optical pickup 126 (FIG. 17) of the optical disc apparatus 120 is compared with the optical pickup 26 (FIG. 7) according to the first embodiment, the red laser diode 31 and the like can be omitted. Hence, the configuration of the optical pickup 126 can be simplified. As a result, it is possible to improve the response of the optical pickup 126 during movement in the tracking direction owing to the reduced weight, and it is also possible to reduce cost and the like owing to the reduced number of components.

With the configuration described above, just as in the case of the control section 21 of the optical disc apparatus 20 according to the first embodiment, in the control section 121 of the optical disc apparatus 120 according to the second embodiment, when information is recorded on the optical disc 200, both the focuses Fb1 and Fb2 of the two blue light beams Lb1 and Lb2 are aligned with a target mark position and interfered with each other to form the recording mark RM. On the other hand, when information is reproduced from the optical disc 200, the focuses Fb1 and Fb2 of the two blue light beams Lb1 and Lb2 are aligned with target mark positions being different from each other, whereby the blue reproduction light beams Lb5 and Lb6 can be generated from the first and second recording marks RM1 and RM2 disposed at the positions being different from each other inside the recording layer 101 of the optical disc 100, and two channels of reproduction signals are obtained. By integrating these two channels of the reproduction signals, the control section 121 can generate one reproduction signal having twice the reproduction speed.

(4) Other Embodiments

In the first and second embodiments described above, two channels of reproduction signals obtained by generating the two blue reproduction light beams Lb5 and Lb6 via the two blue light paths are integrated to generate one reproduction signal having twice the reproduction speed. However, the present invention is not limited to this configuration. For example, it may be possible that three or four or more blue light paths are provided and three or four or more blue reproduction light beams are generated to obtain three or four or more channels of reproduction signals, and that the reproduction signals are integrated to generate one reproduction signal having three or four times or more the reproduction speed.

In this case, it may be possible to have a configuration in which relay lenses are provided in the respective blue light paths and adjusted so that the focuses Fb of the blue light beams Lb to be irradiated to the optical disc 100 or 200 are aligned with the positions (depths) being different from one another, and a pinhole plate disposed just ahead of a photodetector detects the amount of only the desired blue reproduction light beam.

Furthermore, in the first embodiment described above, the light beam (referred to as the position-controlling light beam) that is used to control the position of the objective lens 36 is a red light beam having a wavelength of approximately 660 [nm], and the light beam (referred to as the recording light beam) that is used to form the recording mark RM is a blue light beam having a wavelength of approximately 405 [nm]. However, the present invention is not limited to this configuration, and the position-controlling light beam and the recording light beam may have any wavelength.

In this case, the reflection/transmission film 104 should only have a property of reflecting the position-controlling light beam according to its wavelength and transmitting the recording light beam according to its wavelength. In addition, the recording layer 101 should only be made of a material responding to the wavelength of the recording light beam.

Furthermore, in the second embodiment, both the position-controlling light beam and the recording light beam are blue light beams having a wavelength of approximately 405 [nm]. However, the present invention is not limited to this configuration, and the position-controlling light beam and the recording light beam may have any wavelength.

Moreover, in the first and second embodiments described above, the depth of the target mark position (the distance from the reflection/transmission film 104 or 204) inside the optical disc 100 or 200 is adjusted using the relay lens 58 and 76. However, the present invention is not limited to this configuration. The depth of the target mark position may be changed, for example, by moving a single condensing lens or by controlling the focus of the objective lens 36, or by using other methods.

Besides, in the first and second embodiments described above, the optical axis of the red light beam Lr1 is aligned with that of the blue light beam Lb1. However, the present invention is not limited to this configuration. For example, the optical axis of the red light beam Lr1 may be tilted with respect to that of the blue light beam Lb1 by a predetermined angle so that the target track is not intentionally aligned with the target mark position (in other words, offset) as viewed from the face 100A of the optical disc 100.

Still further, in the first and second embodiments described above, the focus error signal is generated using the astigmatism method in the position-controlling optical systems 30 (FIG. 7) and 90 (FIG. 18) and the information optical system 50 (FIG. 7) and 98 (FIG. 19). However, the present invention is not limited to this configuration. For example, the focus error signal may be generated using the knife-edge method, the Foucault method or other methods.

Additionally, the method that is used to generate the tracking error signal in the position-controlling optical systems 30 and 90 is not limited to the push-pull method, but the three-beam method, the differential push-pull method or other methods may also be used to generate the tracking error signal.

In the cases described above, an optical device, such as a diffraction grating, may be provided instead of the cylindrical lenses 38 and 86 depending on the method that is used to generate each error signal. Furthermore, in the photodetectors 39 and 83, its detection area should only be divided according to a pattern corresponding to the method that is used to generate each error signal. Moreover, in the signal processing section 23, each error signal should only be generated by carrying out arithmetic processing corresponding to the method that is used to generate each error signal.

Furthermore, in the first and second embodiments described above, the spherical aberration of the blue light beams Lb1 and Lb2 and the blue reproduction light beams Lb5 and Lb6 and the comatic aberration due to the inclination of the optical disc 100 (200) are corrected using the liquid-crystal panels 56 and 71. However, the present invention is not limited to this configuration. The spherical aberration and the comatic aberration due to the inclination of the optical disc 100 (200) may be corrected using other various optical devices, such as an expander lens.

Moreover, in the embodiments described above, the diameter of the optical disc 100 (200) is set at approximately 120 [mm], the thickness t1 of the recording layer 101 is set at approximately 0.3 [mm], and the thicknesses t2 and t3 of the substrates 102 and 103 are set at approximately 0.6 [mm]. However, the present invention is not limited to this configuration, but other values may also be used. In the case of using other values, the optical characteristics, arrangements, etc. of various optical components should only be set so that the focuses of the blue light beams Lb1 and Lb2 are aligned with the target mark position in consideration of the thickness values of the recording layer 101 and the substrates 102 and 103 and the refraction indexes and the like of various materials.

Still further, in the embodiments described above, the optical disc apparatus 20 (120) serving as an optical disc apparatus is formed of the relay lens 58 and the control section 21 (121) serving as first focus position adjusting means, the relay lens 76 and the control section 21 (121) serving as second focus position adjusting means, the control section 21 (121) serving as controlling means, and the photodetectors 63 and 83 serving as first and second detecting means. However, the present invention is not limited to this configuration, but the optical disc apparatus may be formed of first focus position adjusting means, second focus position adjusting means, controlling means, and first and second detecting means, respectively having other various circuit configurations.

The present invention is applicable to optical disc apparatuses that are adapted to record various data, such as video and audio data, on optical discs and to those adapted to reproduce such various data from optical discs.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus reproducing information on the basis of a standing wave recorded on a disc-like volume type recording medium, comprising:
a first focus position adjusting means for adjusting the position of a focus on which a first light beam focuses inside a recording layer inside the volume type recording medium in the optical axis direction of the first light beam;
a second focus position adjusting means for adjusting the position of a focus on which a second light beam focuses inside the recording layer in the optical axis direction of the second light beam;
a controlling means for controlling the first focus position adjusting means and the second focus position adjusting means so that, when the standing wave is recorded on the volume type recording medium, the first light beam focuses inside the recording layer and the second light beam transmitted through the recording layer and then reflected by a predetermined reflection face focuses on the same position as the first light beam focuses and, when information is reproduced on the basis of the standing wave on the volume type recording medium, the position of the focus on which the first light beam focuses inside the recording layer and the position of the focus on which the second light beam focuses inside the recording layer are different from each other, thereby generating first and second reproduction light beams from standing waves different from each other; and
first and second detecting means for detecting the first and second reproduction light beams.

2. The optical disc apparatus according to claim 1, wherein the first and second detecting means cause mixed reproduction light in which the first and second reproduction light beams are mixed to converge and selectively detects the first or second reproduction light beam using a pinhole provided at the focus position of the first or second reproduction light beam.

3. The optical disc apparatus according to claim 1, further comprising:
an objective lens controlling means for irradiating a predetermined third light beam to the volume type recording medium via an objective lens while the optical axis of the third light beam is aligned with that of the first light beam and controlling the position of the objective lens on the basis of a return light beam from a positioning layer provided in the volume type recording medium.

4. The optical disc apparatus according to claim 3, wherein the positioning layer is provided with a track indicating the recording position of the standing wave, and the objective lens controlling means controls the position of the objective lens after recognizing the track on the basis of the return light from.

5. The optical disc apparatus according to claim 3, wherein the third light beam has a wavelength different from that of the first and second light beams, and the positioning layer, having wavelength selectivity, causes the first and second light beams to be transmitted and causes the third light beam to be reflected, and the objective lens controlling means causes the third light beam to be irradiated to the volume type recording medium and to be reflected by the positioning layer.

6. The optical disc apparatus according to claim 3, wherein the third light beam has the same wavelength as that of the first and second light beams, the positioning layer, the transmission factor of which is adjusted, causes the first and second light beams to be transmitted at a predetermined ratio and causes the third light beam to be reflected at a predetermined ratio, and the objective lens controlling means causes the third light beam to be irradiated to the volume type recording medium and to be reflected by the positioning layer at a predetermined ratio.

7. The optical disc apparatus according to claim 1, further comprising:
a reproduction signal generating means for generating a reproduction signal by integrating the detection results of the first and second detecting means.

8. The optical disc apparatus according to claim 7, wherein the controlling means divides the information every predetermined unit and records each division on the recording layer as the standing wave using the first and second light beams, and the reproduction signal generating means generates the reproduction signal, which is restored to the original information from the standing wave recorded after the division of the information, by integrating the detection results based on first and second reproduction light beams generated from the first and second light beams, respectively.

9. An information reproducing method which generates a reproduction light beam by irradiating first or second light beam via a predetermined objective lens to a standing wave recorded on a disc-like volume type recording medium, the method comprising the steps of:
controlling a first focus position adjusting means for adjusting the position of a focus on which the first light beam focuses inside a predetermined recording layer in the optical axis direction of the first light beam and a second focus position adjusting means for adjusting the position of a focus on which the second light beam focuses inside the recording layer in the optical axis direction of the second light beam so that the position of the focus on which the first light beam focuses inside the recording layer is aligned with the position of the focus on which the second light beam focuses after the second light beam is transmitted through the recording layer and then reflected by a predetermined reflection face when the standing wave is recorded on the volume type recording medium;
controlling the first focus position adjusting means and the second focus position adjusting means so that the position of the focus on which the first light beam focuses inside the recording layer is different from the position of the focus on which the second light beam focuses inside the recording layer when the reproduction light beams are generated, thereby generating first and second reproduction light beams from standing waves different from each other, respectively; and detecting the first and second reproduction light beams.

10. An optical disc apparatus reproducing information on the basis of a standing wave recorded on a disc-like volume type recording medium, comprising:

a first focus position adjusting unit configured to adjust the position of a focus on which a first light beam focuses inside a recording layer inside the volume type recording medium in the optical axis direction of the first light beam;

a second focus position adjusting unit configured to adjust the position of a focus on which a second light beam focuses inside the recording layer in the optical axis direction of the second light beam;

a controlling unit configured to control the first focus position adjusting unit and the second focus position adjusting unit so that, when the standing wave is recorded on the volume type recording medium, the first light beam focuses inside the recording layer and the second light beam transmitted through the recording layer and then reflected by a predetermined reflection face focuses on the same position as the first light beam focuses and, when information is reproduced on the basis of the standing wave on the volume type recording medium, the position of the focus on which the first light beam focuses inside the recording layer and the position of the focus on which the second light beam focuses inside the recording layer are different from each other, thereby generating first and second reproduction light beams from standing waves different from each other; and a first and second detecting unit configured to detect the first and second reproduction light beams.

* * * * *